(12) United States Patent
Raj et al.

(10) Patent No.: US 12,475,381 B2
(45) Date of Patent: Nov. 18, 2025

(54) SYSTEMS AND METHODS FOR PERSONALIZED GUIDANCE

(71) Applicant: Capital One Services, LLC, McLean, VA (US)

(72) Inventors: Rohan Vimal Raj, Plano, TX (US); Cole Coen, Celina, TX (US); Krishna C. Chinthakayala, Frisco, TX (US); Humberto Hernandez Torres, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/603,686

(22) Filed: Mar. 13, 2024

(65) Prior Publication Data

US 2024/0311653 A1    Sep. 19, 2024

Related U.S. Application Data

(60) Provisional application No. 63/490,131, filed on Mar. 14, 2023.

(51) Int. Cl.
*G06F 7/00* (2006.01)
*G06N 5/01* (2023.01)

(52) U.S. Cl.
CPC .................................. *G06N 5/01* (2023.01)

(58) Field of Classification Search
CPC ........................................................ G06N 5/01
USPC ................................................. 707/600–899
See application file for complete search history.

(56) References Cited

U.S. PATENT DOCUMENTS

| | | | |
|---|---|---|---|
| 10,847,138 B2 | 11/2020 | Ward et al. | |
| 11,176,589 B2 | 11/2021 | Pyati | |
| 2019/0324431 A1 | 10/2019 | Cella et al. | |
| 2020/0034357 A1 | 1/2020 | Panuganty et al. | |
| 2021/0281965 A1* | 9/2021 | Malik | H04R 3/005 |

* cited by examiner

*Primary Examiner* — Isaac M Woo
(74) *Attorney, Agent, or Firm* — Bookoff McAndrews, PLLC

(57) ABSTRACT

The present invention describes a computer-based system and method for training machine-learning models for delivering personalized query results. The method starts by collecting user behaviors, then categorizing each behavior and refining these categories based on additional data. The refined categories are used to create sequential, dynamic inputs that serve as both ground truth and training data for the machine-learning model. This process helps to strengthen the connections between the training data and the desired output, resulting in more accurate personalized query results. The system and method may be directed towards providing recommendations to the user, such as in the form of vehicle recommendations.

20 Claims, 23 Drawing Sheets

| VISITOR ID | STEP | INPUT SEQUENCE OF VEHICLE TYPES | TARGET TO PREDICT |
|---|---|---|---|
| CUST 1 | STEP 1 _501_ | USED_SEDAN_VOLKSWAGEN_JETTA_4TO6YRSOLD_10-15K | USED_SEDAN_MAZDA_MAZDA3_7TO10YRSOLD_15-20K |
| | STEP 2 _502_ | USED_SEDAN_VOLKSWAGEN_JETTA_4TO6YRSOLD_10-15K<br>USED_SEDAN_MAZDA_MAZDA3_7TO10YRSOLD_15-20K | USED_SEDAN_MAZDA_MAZDA3_4TO6YRSOLD_15-20K |
| | STEP 3 _503_ | USED_SEDAN_VOLKSWAGEN_JETTA_4TO6YRSOLD_10-15K<br>USED_SEDAN_MAZDA_MAZDA3_7TO10YRSOLD_15-20K<br>USED_SEDAN_MAZDA_MAZDA3_4TO6YRSOLD_15-20K | USED_SEDAN_HUYNDAI_ELANTRA_7TO10YRSOLD_15-20K |
| CUST 2 | STEP 1 _504_ | USED_SEDAN_TESLA_MODEL_3_4TO6YRSOLD_35-40K | USED_SEDAN_HYUNDAI_ELANTRA_7TO10YRSOLD_15-20K |
| | STEP 2 _505_ | USED_SEDAN_TESLA_MODEL_3_4TO6YRSOLD_35-40K<br>USED_SEDAN_TESLA_MODEL_S_7TO10YRSOLD_75-80K | USED_SEDAN_HYUNDAI_IONIQ_4TO6YRSOLD_25-30K |
| | ........ | ........ | ........ |
| | STEP 10 _506_ | USED_SEDAN_TESLA_MODEL_3_4TO6YRSOLD_35-40K<br>........<br>USED_SEDAN_HONDA_CIVIC_HYBRID_>11YRSOLD_10-15K | USED_SEDAN_HONDA_CIVIC_HYBRID_>11YRSOLD_30-35K |

| INPUT SEQUENCE OF VEHICLE TYPES | ENCODED INPUT SEQUENCE | ENCODED INPUT TO STANDARDIZED LENGTH | ENCODED PREDICTION (MODEL OUTPUT) |
|---|---|---|---|
| USED_SEDAN_VOLKSWAGEN_JETTA_4TO6YRSOLD_10-15K | 00050 | [0, 0, 0, 0, 0, 0, 0, 00050] | 03043 |
| USED_SEDAN_VOLKSWAGEN_JETTA_4TO6YRSOLD_10-15K<br>USED_SEDAN_MAZDA_MAZDA3_7TO10YRSOLD_15-20K | 00050<br>03043 | [0, 0, 0, 0, 0, 0, 00050, 03043] | 00786 |
| USED_SEDAN_VOLKSWAGEN_JETTA_4TO6YRSOLD_10-15K<br>USED_SEDAN_MAZDA_MAZDA3_7TO10YRSOLD_15-20K<br>USED_SEDAN_MAZDA_MAZDA3_4TO6YRSOLD_15-20K | 00050<br>03043<br>00786 | [0, 0, 0, 0, 0, 00050, 03043, 00786] | 11736 |

*FIG. 6*

INITIAL (PRETRAINED MATRIX)
715b

| VEHICLE TYPE ID | INDEX-1 | INDEX-2 | ... | INDEX-9 | INDEX-10 |
|---|---|---|---|---|---|
| 00001 | 0.043 | -0.023 | ......... | -0.008 | 0.022 |
| 00002 | 0.045 | 0.001 | ......... | 0.017 | -0.008 |
| ......... | ......... | ......... | ......... | ......... | ......... |
| 09999 | -0.029 | 0.034 | ......... | 0.918 | 0.418 |
| 10000 | 0.038 | -0.818 | ......... | -0.0341 | 0.018 |

FROM FIG. 7B

*FIG. 7B (CONT.)*

TRAINED MATRIX
716f

| VEHICLE ID | INDEX-1 | INDEX-2 | ... | INDEX-9 | INDEX-10 |
|---|---|---|---|---|---|
| 0001 (HONDA CIVIC) | 0.3 | -0.78 SIMILAR VECTORS | ........ | 0.028 | 0.0 |
| 0002 (TOYOTA CAMRY) | 0.45 | -0.94 | ........ | 0.017 | -0.008 |
| ........ | ........ | ........ | ........ | ........ | ........ |
| 09999 (FORD -F150) | 0.09 | 0.034 SIMILAR VECTORS | ........ | 0.918 | 0.418 |
| 10000 (TOYOTA TACOMA) | 0.48 | 0.028 | ........ | 0.872 | 0.543 |

FROM FIG. 7F

1100

RECOMMENDED VEHICLES FOR YOU

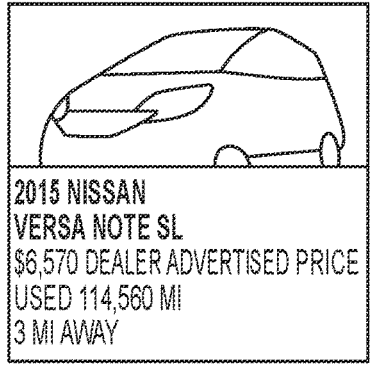

2015 NISSAN
VERSA NOTE SL
$6,570 DEALER ADVERTISED PRICE
USED 114,560 MI
3 MI AWAY

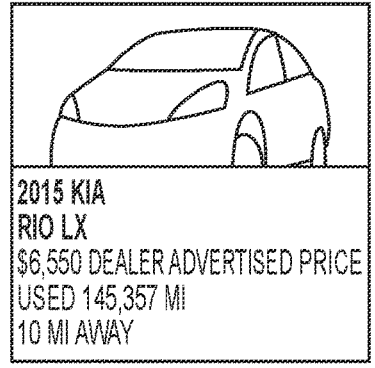

2015 KIA
RIO LX
$6,550 DEALER ADVERTISED PRICE
USED 145,357 MI
10 MI AWAY

• • •

RECOMMENDED USED VEHICLES BELOW $25K

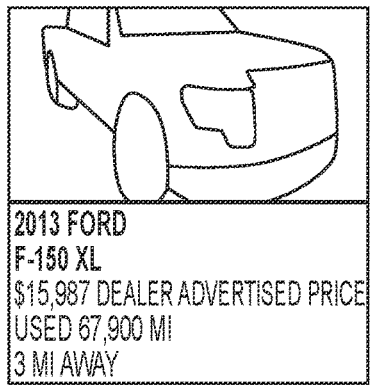

2013 FORD
F-150 XL
$15,987 DEALER ADVERTISED PRICE
USED 67,900 MI
3 MI AWAY

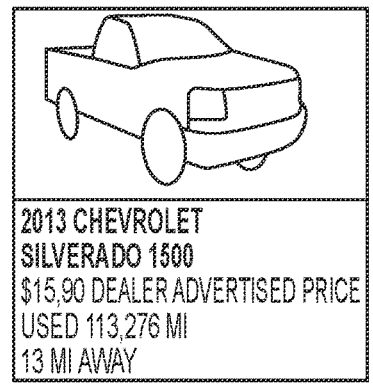

2013 CHEVROLET
SILVERADO 1500
$15,90 DEALER ADVERTISED PRICE
USED 113,276 MI
13 MI AWAY

• • •

RECOMMENDED USED VEHICLES

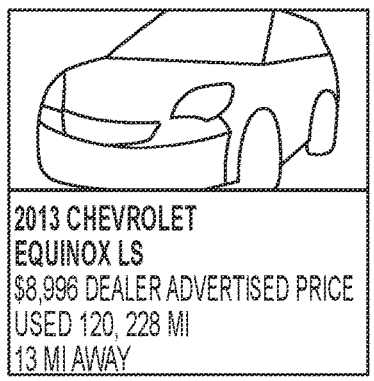

2013 CHEVROLET
EQUINOX LS
$8,996 DEALER ADVERTISED PRICE
USED 120, 228 MI
13 MI AWAY

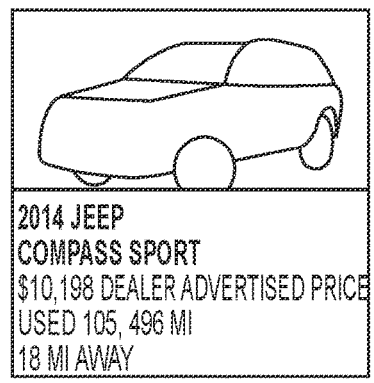

2014 JEEP
COMPASS SPORT
$10,198 DEALER ADVERTISED PRICE
USED 105, 496 MI
18 MI AWAY

• • •

RECOMMENDED VEHICLES UNDER $25K

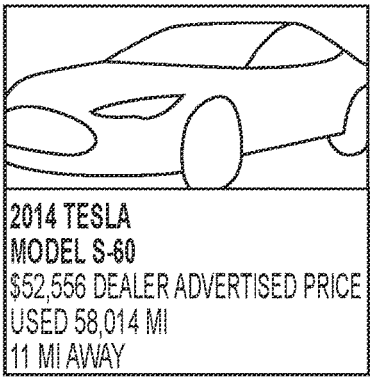

2014 TESLA
MODEL S-60
$52,556 DEALER ADVERTISED PRICE
USED 58,014 MI
11 MI AWAY

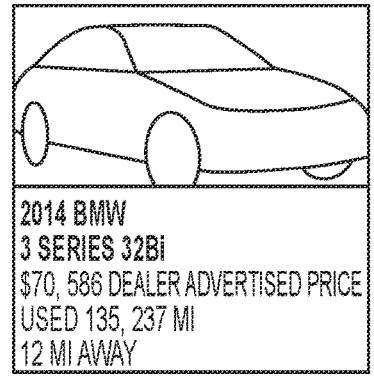

2014 BMW
3 SERIES 32Bi
$70, 586 DEALER ADVERTISED PRICE
USED 135, 237 MI
12 MI AWAY

SYSTEMS AND METHODS FOR PERSONALIZED GUIDANCE

CROSS-REFERENCE TO RELATED APPLICATION(S)

This patent application is a continuation of and claims the benefit of priority to U.S. Provisional Patent Application No. 63/490,131, filed on Mar. 14, 2023, the entirety of which is incorporated herein by reference.

TECHNICAL FIELD

Various embodiments of this disclosure relate generally to machine-learning-based techniques for improved search results, and, more particularly, to systems and methods for dynamic adjustment of inputs both during training and during model use based on external conditions and/or considerations.

BACKGROUND

The process of buying a car is often a complex and challenging task for many consumers. With the vast array of options available in the market, users are faced with the task of sorting through numerous search results, trying to find the right vehicle that fits their preferences and budget. This process can be particularly daunting for those who are unfamiliar with the car-buying process, as they may not know what to look for or how best to narrow down their search results.

In addition to being time-consuming and overwhelming, the process of finding the right car can be frustrating for users. The traditional approach of searching for cars requires users to apply a multitude of filters, such as price, make, model, year, and features, among others. However, the filters provided by most car-buying platforms are limited and do not always accurately reflect the user's preferences. As a result, users may have to sift through hundreds of search results that are not relevant to their needs, making the process even more challenging and frustrating.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for personalized search results and/or guidance.

To address the issues noted above, the disclosed systems and methods utilize machine learning to provide personalized search recommendations (or guidance) for users. The system predicts the user's next desired search and adjusts the recommendations based on relevant inventory, providing a more efficient and streamlined way for users to find the perfect car. This innovative solution offers a personalized and dynamic experience for car buyers, reducing the time and frustration that often comes with the traditional car-buying process.

The machine-learning model is trained using user behavior data and relevant inventory information, allowing it to better understand the user's preferences and provide more accurate recommendations. By taking into account the user's previous search history and adjusting the recommendations in real-time based on the available inventory, the system offers a dynamic and personalized experience for each user.

In some aspects, the techniques described herein relate to a computer-implemented method for personalized search results, including: receiving, by one or more processors, a first data object, the first data object including one or more sequentially ordered user inputs; receiving, by the one or more processors, a second data object, the second data object including data associated with a plurality of items; determining a plurality of filters based on the first data object, wherein each filter includes a priority indicator, and wherein each of the plurality of filters is based on at least part of the one or more user inputs; applying the plurality of filters to the second data object; determining a resulting number of items in the second data object based on applying the plurality of filters; comparing the resulting number of items against a pre-defined threshold; determining the resulting number of items does not satisfy the pre-defined threshold; iteratively removing a filter with a relatively lowest priority indicator of the plurality of filters until the resulting number of items satisfies the pre-defined threshold; generating a token for each one or more user input, the token not including classifications associated with one or more removed filters; inputting the one or more generated tokens in sequential combination to a machine-learning model; generating a third data object based on an output of the model; and displaying the third data object to the user.

In some aspects, the techniques described herein relate to a computer implemented method for training a machine-learning model for personalized query results, including: receiving a plurality of user behaviors, the plurality of user behaviors being in sequential order; generating an initial classification for each user behavior of the plurality of user behaviors; adjusting the classification for each user behavior of the plurality of user behaviors based at least partly on the initial classification and one or more parameters of a first data set; outputting a plurality of sequentially ordered dynamically adjusted model inputs based on said adjusting; utilizing one of the plurality of sequentially ordered dynamically adjusted model inputs as ground truth for training of a machine-learning model; utilizing the sequentially ordered dynamically adjusted model inputs which sequentially proceed the ground truth as training data of a machine-learning model; and reinforcing one or more associations between the training data and ground truth.

In some aspects, the techniques described herein relate to a system for personalized search results, including: a memory storing instructions and a trained machine-learning model that has been trained, based on training sequences of user search queries, to predict a likely next search query in response to input of a sequence of search queries; and a processor operatively connected to the memory and configured to execute the instructions to perform operations, including: receiving a sequence of search queries from a user device associated with a user; predicting a likely next search query from the user by inputting the received sequence of search queries into the trained machine-learning model; generating predicted search results by applying the likely next search query; generating personalized search results by appending the predicted search results to search results from a most-recent query of the sequence of queries from the user; and causing the user device to display the personalized search results.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts an example of serialization of a series of user behaviors for multiple users.

FIG. 6 depicts an example of encoding for a model input.

FIGS. 11A-11B depict machine-learning models, with a focus on an output layer.

DETAILED DESCRIPTION OF EMBODIMENTS

Figure 1:
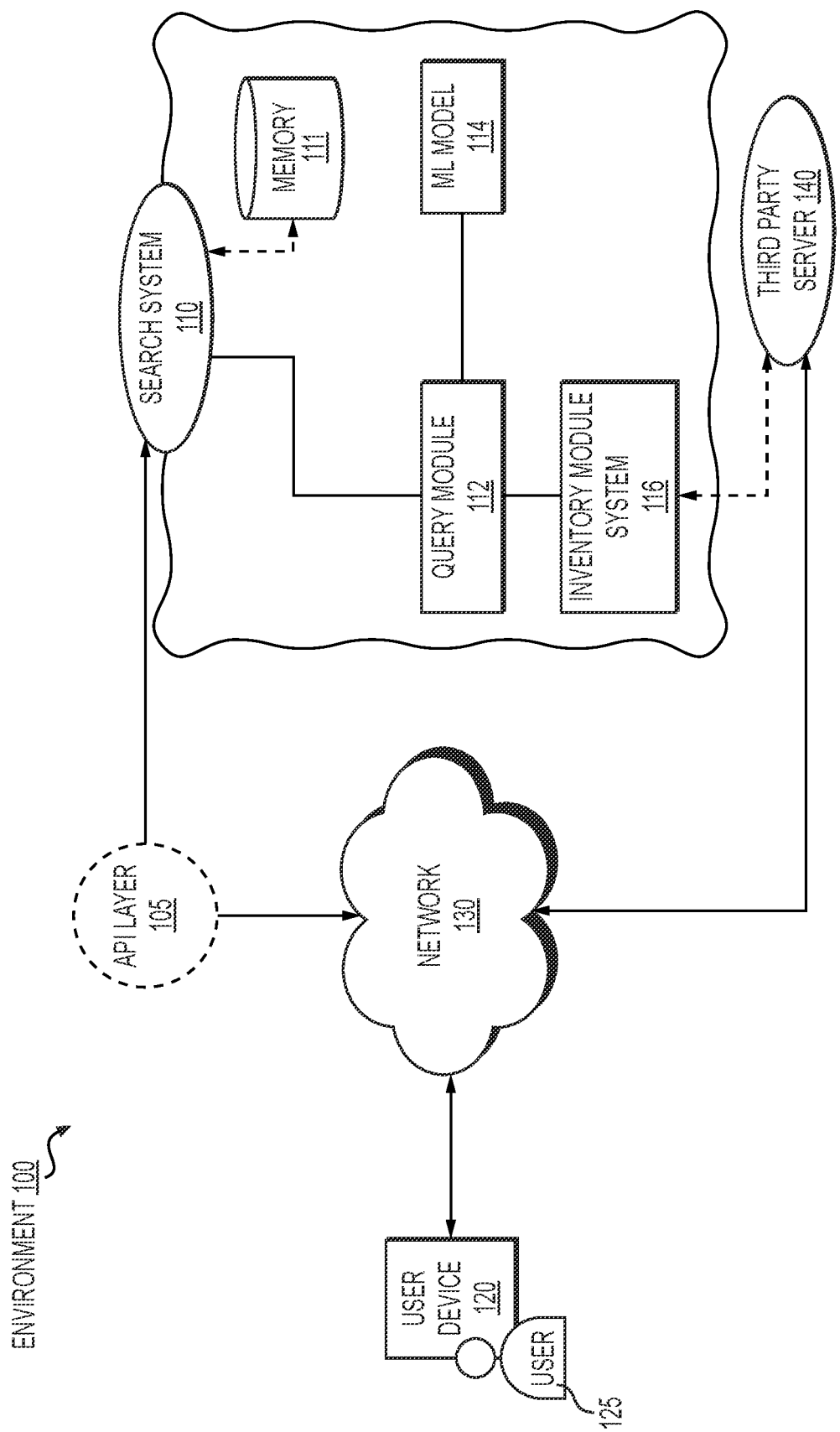
FIG. 1 depicts an exemplary environment for training and/or using a machine-learning model to obtain personalized search results, according to one or more embodiments.

According to certain aspects of the disclosure, methods and systems are disclosed for personalized vehicle search results and recommendation, e.g., non-filter based/constrained recommendations as part of the overall user experience workflow. The problem is that the traditional process of buying a car is often complex, time-consuming, and frustrating for consumers due to the limited options available and the need to sort through numerous search results using various filters. However, conventional techniques may not be suitable. For example, conventional techniques may not accurately reflect the user's preferences and/or patterns/trends which are inherent in their shopping workflow. Accordingly, improvements in technology relating to personalized vehicle search results are needed.

As will be discussed in more detail below, in various embodiments, systems and methods are described for using machine learning to provide personalized search results and recommendations. By training a machine-learning model, e.g., via supervised or semi-supervised learning, to learn associations between user behavior data and subsequent action data, the trained machine-learning model may be usable to predict the next step(s) in a shopping workflow and provide recommendations to the user without the need for the user to adjust filters or instigate additional steps.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of +10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting." depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a consumer is presented with a portal through which to search for vehicles. The user inputs one or more search parameters through the portal and is presented with a listing of vehicles. The user may utilize one or more filter to further narrow the vehicles, but will likely navigate to a vehicle page. At this point, the system which is hosting the portal identifies the user's navigation to a specific vehicle page, and stores within a database a tokenized and/or classified identifier of the user visit. As the user visits new or subsequent vehicle pages, the system is saving tokenized and/or classified identifiers of those vehicles in a sequential order. Once enough vehicle visits have happened (which may only be one), the system can utilize the user's behavior to predict the next search the user may undertake, and/or classifications of vehicles which the user may be likely to view next via a search string or a filter. The system then presents the user with these recommendations, which are not subject to a filter and require little to no user input. These recommendations may be just shown in one large group displaying the overall best scoring vehicle, or the data may be segmented into categories that are relevant or associated with the user's prior behavior. For examiner, if the user was searching for a particular brand of used cars that are red and under $25,000, the results page with the recommendations may include the highest scoring relevant vehicles overall, those which are red and under $25,000, those which are used and of the particular band, or any other similar combination. The system may also recognize trends in categories that are different than those directly searched and/or filtered by the user, for example it may provide vehicles that are categorized as new, but still meet other preferred aspects of the user. As the user continues to interact with new vehicle listings, the system updates in real time, taking into consideration the inventory available to the user.

In another exemplary use case, a machine-learning model may be trained to predict the next vehicle page a user may navigate and/or visit. The machine-learning model utilizes user behavior data as inputs. The user behavior data is typically associated with one or more user visits to a page showing details about a vehicle. Upon a user visit to a vehicle details page, the system stores one or more parameters and/or identifiers associated with the vehicle page in a database associated with the user. As the user visits more vehicles, the database is added to and/or updated in a sequential order. The user behaviors, in their sequential order, may be serialized as a series of sequential inputs to a machine-learning model, with the final search query/user behavior in each linear combination of the series of sequential inputs being utilized as ground truth. The training may utilize back-propagation to build associations and time-series relevant associations between different categories of user behaviors and/or search parameters, resulting in a model which can predict the next user behavior based on a previous series of user behaviors.

While several of the examples above involve vehicle searches, it should be understood that techniques according to this disclosure may be adapted to any suitable type of search. It should also be understood that the examples above are illustrative only. The techniques and technologies of this disclosure may be adapted to any suitable activity.

Presented below are various aspects of machine learning techniques that may be adapted to personalized search results. As will be discussed in more detail below, machine learning techniques adapted to obtain personalized search results may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an exemplary environment 100 that may be utilized with techniques presented herein. One or more user device(s) 120 may communicate across an electronic network 130. As will be discussed in further detail below, one or more search system(s) 110 may communicate with one or more of the other components of the environment 100 across electronic network 130. The one or more user device(s) 120 may be associated with a user 125, e.g., a user associated with one or more of generating, obtaining, or analyzing user behavior data, or the like.

In some embodiments, the components of the environment 100 are associated with a common entity, e.g., a financial institution, transaction processor, merchant, or the like. In some embodiments, one or more of the components of the environment is associated with a different entity than another. The systems and devices of the environment 100 may communicate in any arrangement. As will be discussed herein, systems and/or devices of the environment 100 may communicate in order to one or more of generate, train, or use a machine-learning model to obtain personalized search results among other activities.

The user device 120 may be configured to enable the user 125 to access and/or interact with other systems in the environment 100. For example, the user device 120 may be a computer system such as, for example, a desktop computer, a mobile device, a tablet, etc. In some embodiments, the user device 120 may include one or more electronic application(s), e.g., a program, plugin, browser extension, etc., installed on a memory of the user device 120. In some embodiments, the electronic application(s) may be associated with one or more of the other components in the environment 100. For example, the electronic application(s) may include one or more of a web browser that enables the user 125 to access web pages and web-based services on the internet or a local network. The user device 120 may also include hardware components such as a display, a keyboard, a touch screen, a microphone, a camera, and/or other input/output devices that allow the user 125 to interact with the other systems in the environment 100. Additionally, the user device 120 may be connected to a network that enables the user 125 to access remote resources and services.

The search system 110 may include query module 112, computer-readable memory 111 such as a hard drive, flash drive, disk, etc, one or more machine-learning model 114, and one or more inventory system 116. In some embodiments, the search system 110 includes and/or interacts with an application programming interface 105 for exchanging data to other systems, e.g., one or more of the other components of the environment. The search system 110 may include and/or act as a repository or source for inventory data. For example inventory system 116 may retrieve, store, manipulate, output, and the like, data associated with vehicle inventory. The search system 110 may, through network 130 and in some embodiments by way of inventory system 116, access one or more $3^{rd}$ party server 140 to access and/or update inventory data.

In various embodiments, the electronic network 130 may be a wide area network ("WAN"), a local area network ("LAN"), personal area network ("PAN"), or the like. In some embodiments, electronic network 130 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the search system 110 may one or more of: generate, store, train, or use a machine-learning model 114 configured to provide personalized search results. The search system 110 may include a machine-learning model 114 and/or instructions associated with the machine-learning model 114, e.g., instructions for generating a machine-learning model 114, training the machine-learning model, using the machine-learning model 114 etc. The search system 110 may include instructions for retrieving one or more of user behavior data, query data, inventory data, adjusting said data, e.g., based on the output of the machine-learning model, and/or operating a display to output data, e.g., as adjusted based on the machine-learning model 114. The search system 110 may include training data, e.g., user behavior data, and may include ground truth, e.g., the final user behavior in a selected sequence of user behaviors.

In some embodiments, a system or device other than the search system 110 is used to generate and/or train the machine-learning model. For example, such a system may include instructions for generating the machine-learning model, the training data and ground truth, and/or instructions for training the machine-learning model. A resulting trained-machine-learning model may then be provided to the search system 110.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between prior user behavior data and next user behavior data, such that the trained machine-learning model is configured to determine an output predicted user behavior in response to the input sequentially ordered user behavior data based on the learned associations.

In some instances, different samples of training data and/or input data may not be independent. For example, a grouping of training data may all be derived from a sequentially ordered grouping of user behaviors, where for each sample the ground truth is sequentially selected as each of the user behaviors, with the training data being the sequentially ordered grouping of user behaviors which are ordered sequentially before the selected ground truth, respectively. Thus, in some embodiments, the machine-learning model may be configured to account for and/or determine relationships between multiple samples.

For example, in some embodiments, the machine-learning model of the search system 110 may include a Recurrent Neural Network ("RNN"). Generally, RNNs are a class of feed-forward neural networks that may be well adapted to processing a sequence of inputs. In some embodiments, the machine-learning model may include a Long-Short-Term-Memory ("LSTM") model and/or Sequence to Sequence ("Seq2Seq") model. An LSTM model may be configured to generate an output from a sample that takes at least some previous samples and/or outputs into account.

In some embodiments, an encoding tensor may be used as a data structure for representing and processing information related to different vehicle categories. The tensor may be in the form of a 2D matrix where each entry corresponds to a particular vehicle category. Each entry in the matrix may contain a set of index values that are initially randomized and then updated during training to build associations between vehicle types and the sequential ordering of vehicle types. By using this encoding tensor, it may be possible to efficiently encode and process large amounts of vehicle-related data for tasks such as classification, prediction, or recommendation.

One possible variation of this approach is to use a higher-dimensional tensor, such as a 3D, 4D, or other higher order tensor, to encode additional information about the vehicles or their attributes. For example, a 3D tensor could have one dimension for the vehicle category, another for one or more parameter of the vehicle, and a third which serves as index values. Another variation is to use different types of encoding methods, such as hashing, clustering, or embedding, to generate the index values for each entry in the encoding tensor. These variations may provide additional flexibility and power in representing and processing vehicle-related data for different applications.

In some embodiments, one or more encoding matrix may be utilized. The encoding matrix may be, in some embodiments, a tensor. The encoding matrix may initially be randomized with one or more value and subsequently trained to learn associations between one or more category, such as a category of vehicles, and/or one or more time-sequence-dependent associations between the same.

After training the index values of the 2D tensor, each entry in the tensor will have a set of index values that encode the associations between the vehicle categories and their sequential ordering. These index values can be used to cluster the vehicle categories based on their similarities.

One way to do this is to calculate the distance between the index values of each pair of entries in the tensor. Entries with similar index values will have a smaller distance between them, while entries with dissimilar index values will have a larger distance between them. The distance between each pair of entries can be plotted in a distance matrix or distance plot, where the entries with the smallest distance represent the most similar vehicle categories, and entries with the largest distance represent the most dissimilar vehicle categories.

Using this distance plot, it may be possible to identify clusters of vehicle categories that are most similar to each other based on their index values. These clusters can be used to group similar vehicles together and help in tasks such as classification or recommendation. For example, if a user searches for a specific type of vehicle, the system can use the trained tensor to find the cluster of vehicle categories that are most similar to the searched vehicle, and recommend vehicles from within that cluster.

Although depicted as separate components in FIG. 1, it should be understood that a component or portion of a component in the environment 100 may, in some embodiments, be integrated with or incorporated into one or more other components. In some embodiments, operations or aspects of one or more of the components discussed above may be distributed amongst one or more other components. Any suitable arrangement and/or integration of the various systems and devices of the environment 100 may be used.

Further aspects of the machine-learning model and/or how it may be utilized to personalize search results are discussed in further detail in the methods below. In the following methods, various acts may be described as performed or executed by a component from FIG. 1, such as the search system 110, the user device 120, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
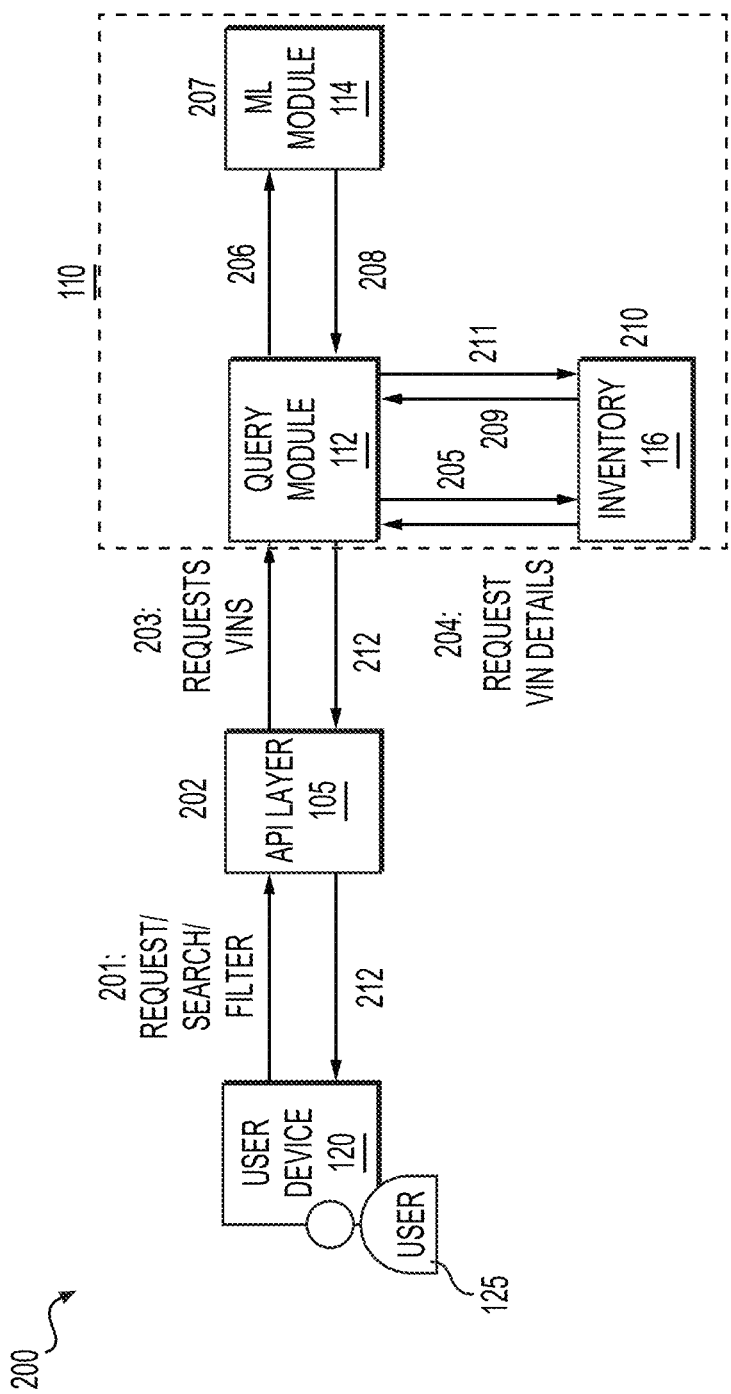
FIG. 2 depicts a flowchart of an exemplary method utilizing a search system to obtain personalized search results, according to one or more embodiments.

FIG. 2 illustrates a workflow 200, which may be a method or a portion of a method of the present system, according to some embodiments, for a user 125 to make a request to the search system 110 and be provided with one or more personalized search result. The workflow may be included as one or more step within a method of the present disclosure. In the workflow shown, a user 125 interacts with a search system 110 through one or more API 105, and may do so through the use of one or more user device 120.

The workflow 200 may begin at step 201, where a user 125 may make a request, such as by user device 120. The request may be a search query or related to a search query, and/or the request may be for additional details about a particular item or datum associated with a search query, such as details associated with a particular vehicle or Vehicle Identification Number (VIN). The request may be sent over a data connection, such as one facilitated by network 130, to either a search system 110 or an intermediary API 105, which at step 202 intakes the request and routes or otherwise modifies/transforms the request to associated with a particular VIN or data entry associated with the search system 110. At the API, the initial request may not be for a particular VIN, however the API may intake the request and interpret, decode, or the like, the request as a request for a specific VIN. The API then passes the request for the VIN to the search system 110. It will be appreciated that what is depicted is a preferred embodiment and that some embodiments may not include an API layer. In such embodiments, the request from the user is passed directed to the search system 110.

At step 203, the query module 112 receives the request for a particular VIN, processes said request into a form and/or format which is readable by an inventory system 116, and transmits the request to the inventory system 116. The query module 112 may store the VIN request and associated the request with a unique identifier tied to the user, such as a cookie or tracker ID or the like. The VIN request may be stored alone, or along with other requests from the same user. The storage may be order-agnostic, but in a preferred embodiment where there are multiple sequential requests by the user, the requests are stored in sequential order or with one or more parameter which indicates the sequential order of the requests, which may result in a linearly ordered set, or a totally ordered set. The ordering is discussed in more detail below.

At step 204, the inventory system 116 receives the VIN request and accesses one or more database to fine information associated with a VIN of the VIN request. The information may include a direct VIN, and the information may also include classification and/or categorical information, such as make and model, year, price, body style, mileage, transmission type, exterior color, features (such as interior features, safety features, and the like), vehicle condition (new, used, and the like), location, and the like. The inventory system compiles at least some of this information into a data packet and sends the data packet and/or information to the query module 112. In some embodiments, the inventory system also provides a categorization report, inventory data, and/or data packet to the query module 112. More information regarding the categorization report and/or data packet is discussed below.

At step 205, the query module 112 receives the information from the inventory system 116 and assesses and/or categorizes the information into a user behavior string. This categorization may be done by utilizing one or more of the classification and/or categorical information provided by the inventory system 116, along with the categorization report, inventory data, and/or data packet received from the inventory system 116. Moreover, this categorization may be dynamic and responsive to the present inventory in the inventory system 116. More information regarding the categorization and dynamic categorization is discussed below.

At step 206, the query module sends the dynamically categorized search query to a machine-learning model module 114. The query module may send just a single query, or the query module may send a plurality of sequentially ordered queries. In either case, the queries are provided to the machine-learning module in a format which enables the use of the one or more queries as inputs to the machine-learning module 114. This may include providing a data packet to the machine-learning module which includes one or more search queries and, where necessary, one or more zero-padded entries to develop an input file for the machine-learning model module. The structure of the input file is discussed in more details below.

At step 207, the machine-learning model module 114 receives the input from the query module 112. The machine-learning model 114 may utilize the input, which as discussed may be based on one or more dynamically categories search query and/or user behavior. The machine-learning model 114 has been trained to output a predicted next user behavior, which in some embodiments may be a category or likelihood of a category or combination of categories that the user will search next. In some embodiments, the output of the machine-learning model may be a ranked prioritization of one or more parameters of associated with a dataset of vehicles, such as an inventory of vehicles. Further, the output may be a predictive or recommendation value for each unique VIN within a dataset of vehicles, each vehicle having a unique VIN, where the recommendation value is a prediction of a user behavior associated with the VIN, such as that VIN being associated with the next vehicle the user may view, that VIN being associated with a vehicle the user may ultimately lease, that VIN being associated with a vehicle that user may ultimately buy, or the like.

At step 208, the machine-learning model modules 114 sends the output to the query module 112, which intakes the output and recognizes one or more vehicles and/or one or more categories and/or types of vehicles which the machine-learning model output indicates may be on interest to a user and/or may be associated with a next user behavior. The query module then prepares a request to the inventory system 116, the request being for information related to one or more specific VIN and/or one or more categories and/or types of vehicles.

At step 209, the query module 112 then sends the request to the inventory system. At step 210, the inventory system receives the request and prepares a data package which includes information relevant to the request, which may be specific VINs, vehicle information and categories associated with specific VINs, VINs associated with specific categories and vehicle information, information associated with the available inventory, one or more of the foregoing, or the like. The inventory system then sends this data package to the query module 112.

At step 211, the query module 112 then intakes the data package and structures the data so as to present one or more recommendations to the user. For example, the data may be structured such that overall vehicle recommendations are noted, while the data may also be structured such that the recommendations are categorically organized, with more relevant categories being displayed before less relevant categories and with vehicles within each category being ordered based on local relevancy related to the category or overall relevancy related to the prior user behavior, as predicted by the machine-learning model. More discussion on the structuring of the data is presented below. The query module then sends the structured data to either the API 105 or the user device 120, as appropriate.

At step 212, the user device receives the structured data, either directly from search system 110 or from API 105, or in parts from either/both. The user device 120 may then display the structured data to the user to provide recommendations to the user based on overall predicted user behavior and categorically-relevant predicted user behavior. As the user continuously browses a website and selects additional vehicles and associated VINs to view (which may be a user behavior), the method may be repeated, adding each new user behavior in sequential order to be utilized as a potential input to the machine-learning model.

Figure 3:
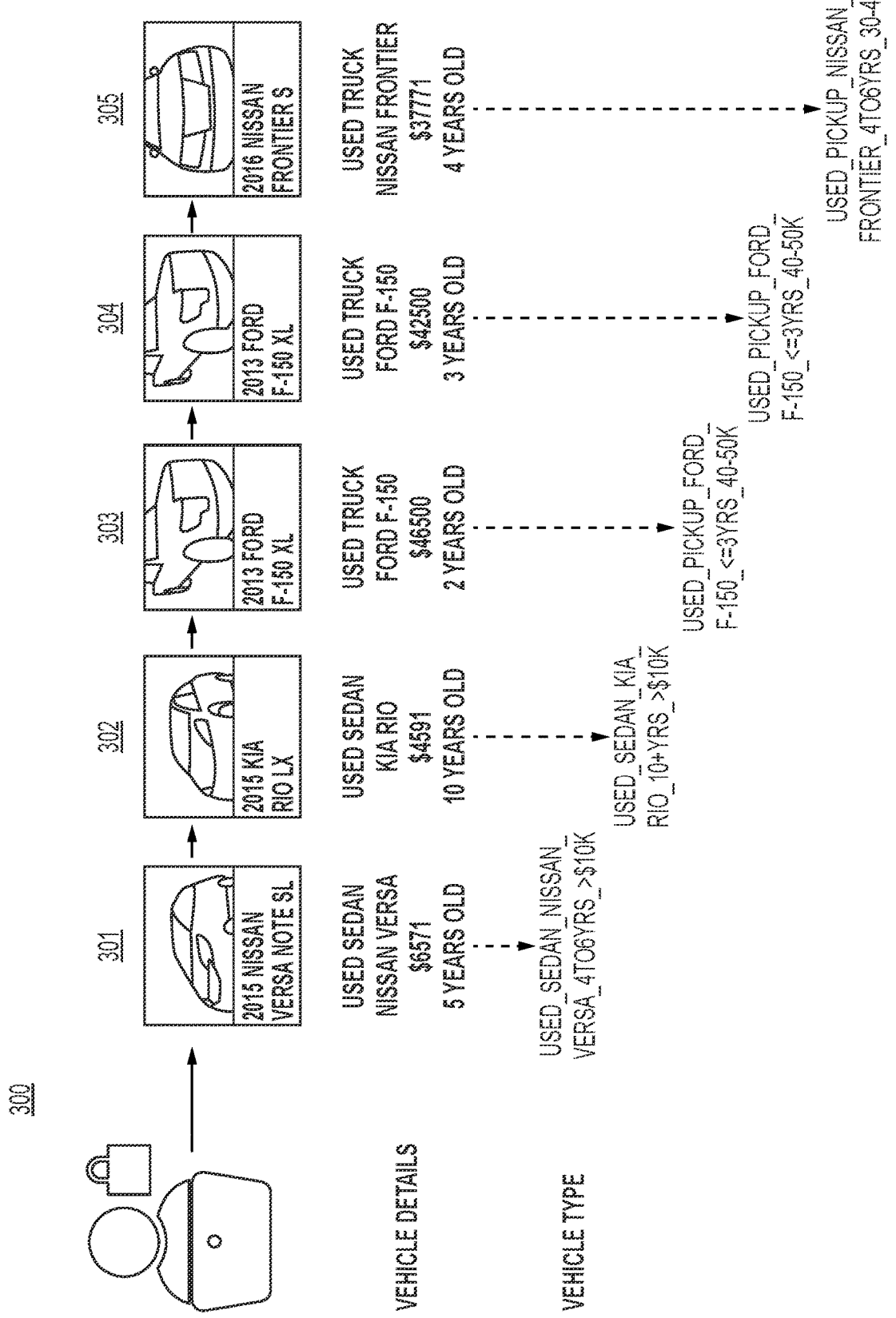
FIG. 3 depicts an example of a series of user behaviors.

Referring to FIG. 3, a string of user behaviors (301, 302, 303, 304, 305), according to some embodiments, is shown. A tracking ID may be associated with a particular user that may capture and store user behavior activity when visiting a website associated with a specific vehicle and/or VIN. The tracking mechanism may be implemented using various methods known in the art, including the use of cookies or other tracking technologies. When a user visits a page associated with a particular vehicle and/or VIN, the tracking mechanism may capture information related to the vehicle, such as the make, model, year, and condition of the vehicle, or the like. To categorize the user visit into a single string, the system concatenates the relevant information into a standardized format. For example, the system may generate a string in the format of "Condition_Bodystyle_Make_Model_Age Range_Price", with each field separated by an underscore. For example, the string of Used_Sedan_Nissan_Versa_4to6yrs_>$10 k" is shown at 301. This standardized format may allow the system to easily tokenize the string later on, by splitting it at each underscore or otherwise delineating one or more category or feature of the string by the format of the string FIG. 3 demonstrates several example of strings (301, 302, 303, 304, 305) which may results from various user behaviors.

The system may the generated string in a database, along with information related to any additional user behavior, such as whether the user purchased or leased the vehicle. The database may include an index that allows the system to quickly search and retrieve specific information related to the vehicle or VIN, such as all visits associated with a particular make or model, or the like, or may allow the system to delineate a sequential order of user visits.

Figure 4:
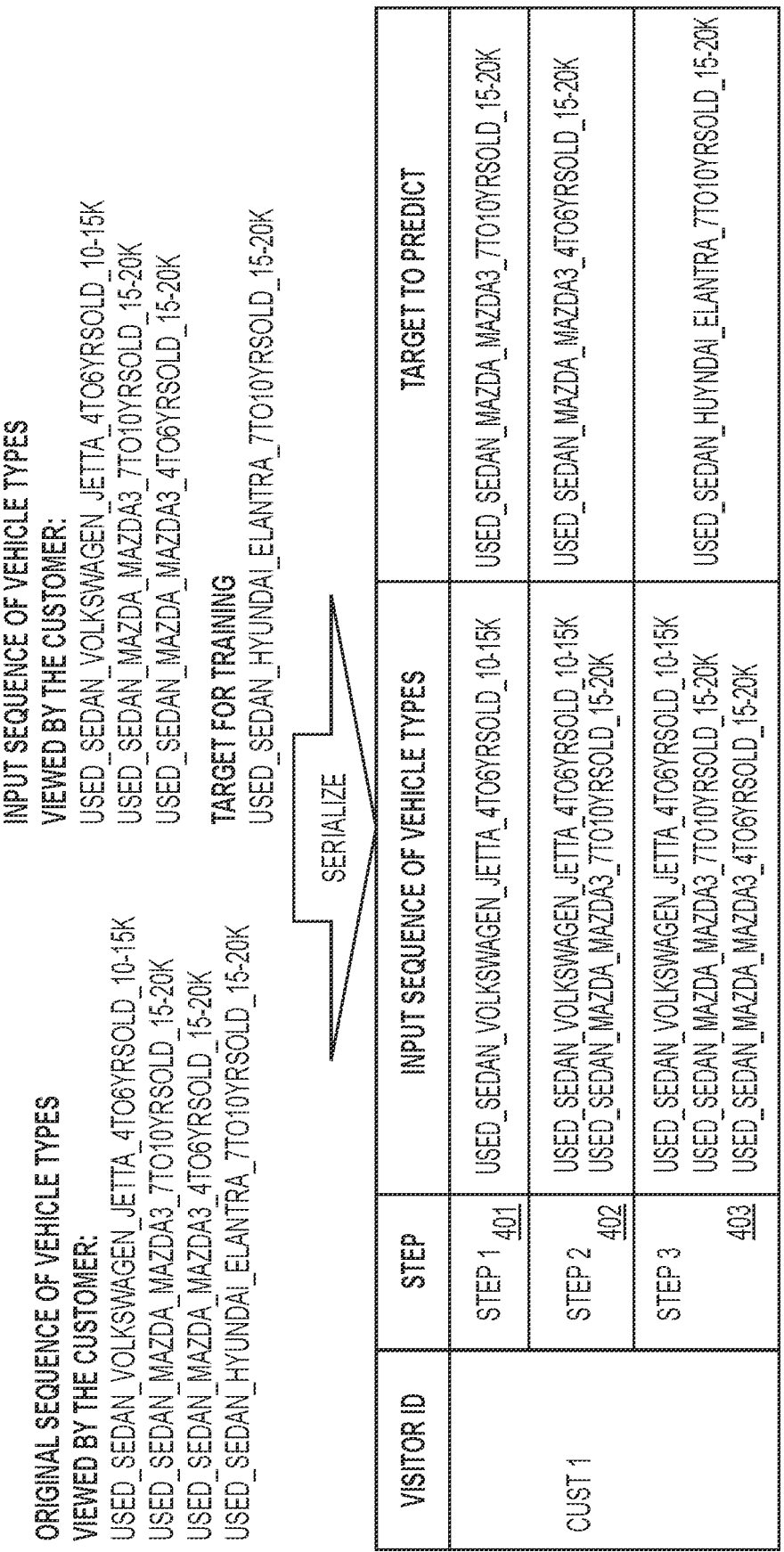
FIG. 4 depicts an example of serialization of a series of user behaviors.

Referring to FIG. 4, in the context of the system and method for tracking user visits to a website associated with a vehicle and/or VIN, the sequential order of user behaviors and vehicles/VINs visited is an important aspect of the system's functionality and usefulness. The sequential order of user behaviors and vehicle/VIN visits allows for the creation of a comprehensive user activity history, which can be analyzed to provide insights into user behavior and preferences. By storing user behavior in sequential order, the system can track the user's journey as they interact with the website and engage with different vehicles/VINs. For example, the system can track when a user first visits the website, which vehicles/VINs they initially view, and which vehicles/VINs they ultimately purchase or lease, and/or what categories the vehicles/VINs belong to.

Still referring to FIG. 4, and overall sequence of user behaviors and the resulting sequentially ordered strings are shown. The system utilizes a multi-step process (shown at Step 1 401, Step 2 402, and Step 3 403) to serialize the strings as inputs and targets for training one or more machine-learning model. As shown in FIG. 4, an overall sequence of user behaviors (shown as 4 user behaviors, but it will be appreciated that a sequence may be as few as two and without an upper bound) is shown. The sequence includes a series of strings (shown in FIG. 4 as "Used_Sedan_Volkswagen_Jetta_4to6yrsOld_10-15 k", "Used_Sedan_Mazda_Mazda3_7to10yrsOld_15-20 k", "Used_Sedan_Mazda_Mazda3_4to6yrsOld_15-20 k", and "Used_Sedan_Hyundai_Elantra_7to10yrsOld_15-20 k"), which includes a first string followed by subsequent strings until an nth string (in the case of FIG. 4, a 4th string) appears at the end of the sequential order of strings. As shown in the chart in FIG. 4, a series of 'steps' that the user has undertaken can be used to recreate the entire journey of the user behaviors as they interact with multiple vehicle pages. The journey is then serialized in a sequence of steps (401, 402, 403), where each string in the sequence (except for the first string) is utilized as a target to predict, or ground truth, in training a machine-learning model, while all prior search strings are utilized as inputs in sequential order. For example, at 401 the first string in the sequence is utilized as the input and the $2^{nd}$ string is utilized as the target. By way of further example, at 402 the first and second string in the sequence are utilized as an input sequence, while the third string is used as the target. By way of further example, at 403 the first, second, and third strings in the sequence are utilized as an input sequence, while the fourth string is used as the target. it will be appreciated that this pattern may be repeated for as many steps as the user has taken in their journey, up to an nth step. In this way, the entire user journey may be serialized and utilized as training data (both as inputs and ground truth) to train a machine-learning model to learn associations between vehicles, vehicle categories, and/or user behaviors associated with vehicles and/or vehicle categories.

As shown in FIG. 5, this serialization of the journey may be performed for each user interacting with the system, which in a short amount of time provides a large number of data points to utilize as inputs for training the model, as each user behavior within the user journey may be utilized as a unique input to the model. For example, in FIG. 5, a first user's behaviors results in a first step 501, second step 502, and a third step 503 for the first user, while a second user's behaviors result in a first step 504, a second step 505, and a third (or tenth) step 506 for the second user.

Referring to FIG. 6, the serialization may further include encoding the serialization to create one or more encoded input 605. The encoding may include taking each of the serialized input sequences and assigning a pre-defined encoded input sequence to each input sequence. Each pre-defined encoded input sequence may relate to a particular categorization or combination of categorizations of one or more vehicle parameters. For example, the encoded input sequence "00050" may relate or otherwise define the associated categories of "Used, Sedan, VOLKSWAGEN, JETTA, 4 to 6 years old, 10-15 k miles", as shown in the figure, while the encoded input sequence "03043" may relate or otherwise define the associated categories of "Used, Sedan, MAZDA, MAZDA3, 7 to 10 years old, 15-20 k miles", as shown in the figure. It will be appreciated that these are exemplary encoded inputs, and that the present disclosure considers other implementations of encoded inputs, where various numerical strings relate to one or more associated categories.

Where multiple inputs are utilized, multiple encoded inputs may also be utilized. In some embodiments, the multiple inputs may be associated with multiple visits by one or more user in sequence, or visits by a user to multiple vehicle information pages, whether those visits occur during a single or multiple sessions of the user. In some embodiments, once the one or more encoded input is determined (and, in some embodiments, an encoded input sequence), a vector is developed with contains the encoded input sequence. The vector, in some embodiments, may be of a standardized length, such as 10 (or other suitable number as permitted by model infrastructure), which is shown in the FIG. at 610. This standardized length may be the length of the sequence of visits considered when predicting a next user behavior and/or visit. This may be determined by the structure of the model (i.e. only a certain number of inputs are accepted by the model), or it may be the length of an input which produces the highest quality results. In such cases where a standardized length is present, when an encoded input sequence includes fewer entries than the standardized length, the vector is 'zero-padded' prior to being passed to one or more machine-learning model. The zero padding may take the form of adding zeros before and/or after the non-zero input sequence to ensure the vector is 'filled' to its standardized length. For example, where the standardized length is 10 and the encoded input sequence contains three encoded inputs, then seven zeros are added to the vector prior to the three encoded inputs to ensure the overall vector length is equal to the standardized length. Where an encoded input sequence includes more encoded inputs than the standardized length, the earliest encoded inputs in the sequence are truncated to ensure that the resulting encoded input sequence fits the standardized length. For example, if the standardized length is 10 and the encoded input sequence includes 14 encoded inputs, the first four encoded inputs in the sequence will be truncated and only the final 10 will be utilized in the vector.

Figure 7A:
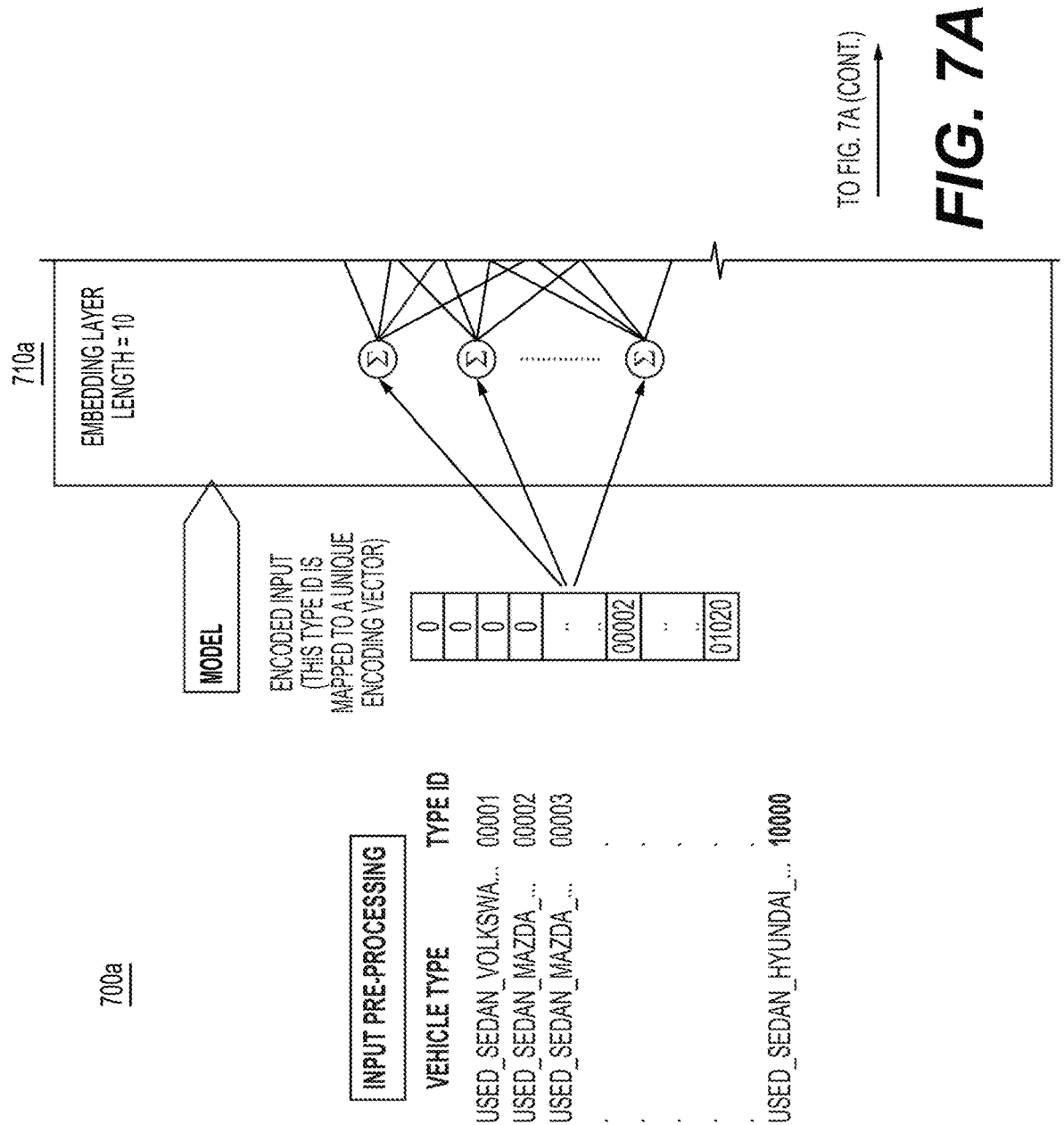
FIGS. 7A-7F depict machine-learning models, according to some embodiments.
Figure 7A:
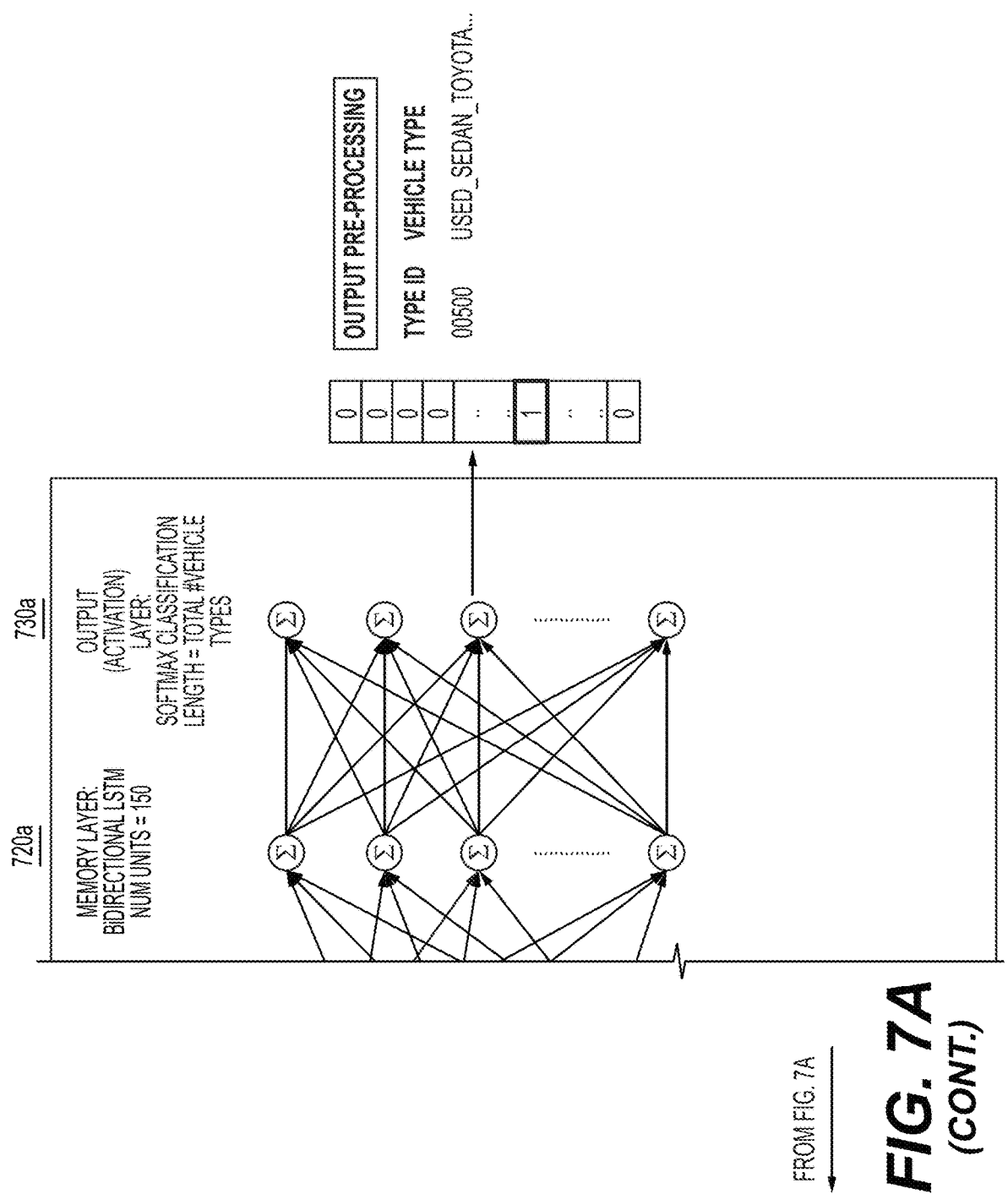

Referring to FIG. 7A, a representative structure for a machine-learning model 700a is depicted. The model represented in FIG. 7A includes three layers: an embedding layer 710a, a memory layer 720a, and an output (activation) layer 730a. The embedding layer receives encoded input (which in some embodiments is a standard length to fit the needs of the model), the memory layer serves to capture and learn temporal dependencies in the encoded input sequence (in some embodiments, by selectively remembering or forgetting information from previous time steps using its gating mechanism, such as through a LSTM module), and the output (activation) layer which turns the neuron output into a vector which is utilized to determine a vehicle type. It will be appreciated by one of ordinary skill in the art that one or more transformers may be utilized as part of or in replacement of the memory layer, depending on the specific needs and requirements of the task at hand. Transformers may use self-attention mechanisms to compute contextual embeddings of the input sequence.

Figure 7B:
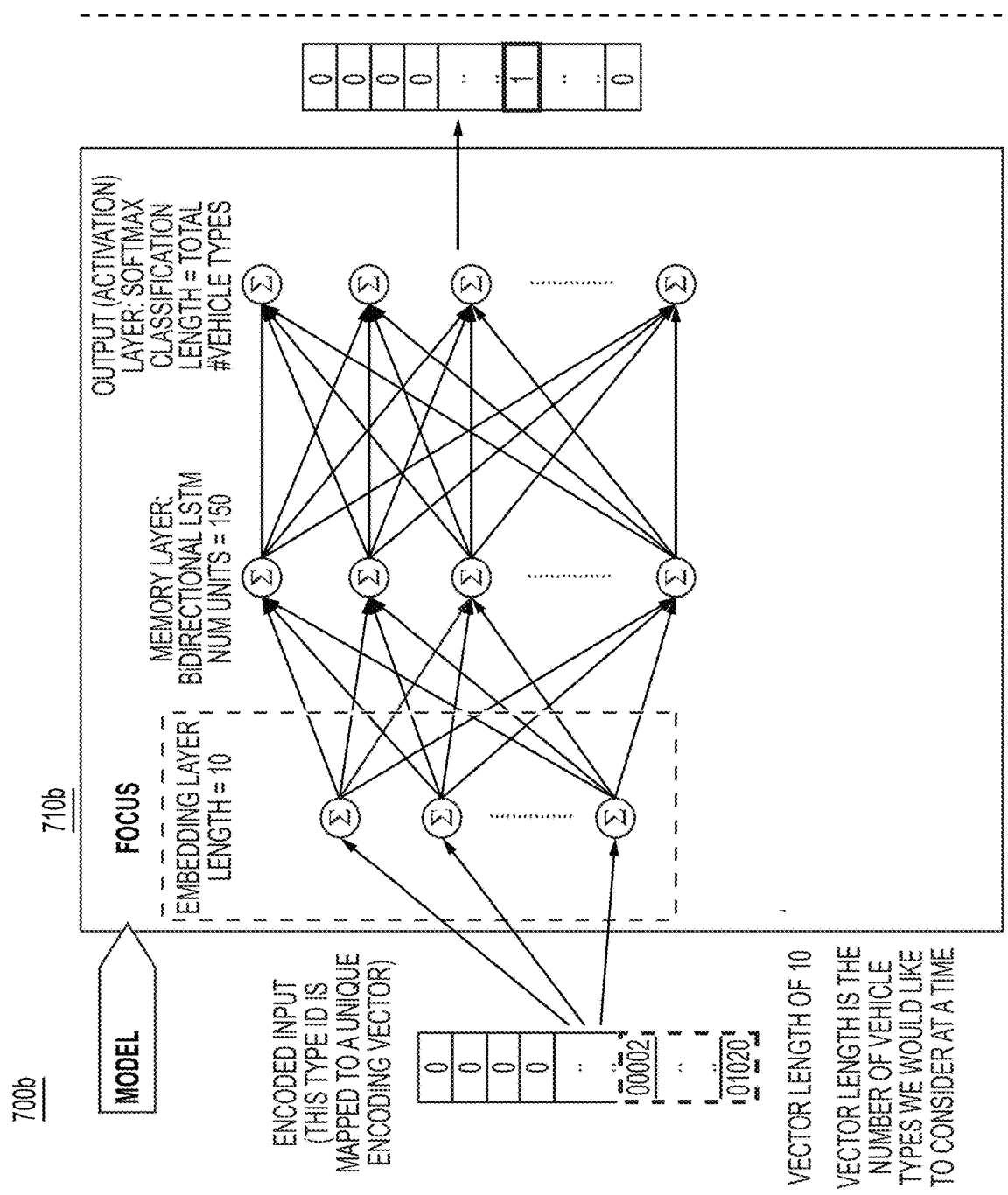

Referring to FIG. 7B, the embedding layer 710b is utilized to encode one or more vehicle types. The embedding layer may be utilized to encode all vehicle types, and may be utilized to capture similarities between one or more vehicle types. To achieve this, a similarity matrix (or tensor matrix) 715b may be formed which establishes indexed values associated with each vehicle type id (potential encoded input). The structure of the matrix may be representable in a row-column format, where each row represents a potential encoded input and each column represents an index value. In some embodiments, the structure may be that of a tensor matrix. A tensor, in some embodiments, is a mathematical object that represents a multi-dimensional array of numerical values. In particular, a tensor can be thought of as a generalization of a matrix to higher dimensions. In some embodiments, a 2D tensor comprises a rectangular grid of numerical values, where each element is identified by its row and column indices. In one embodiment, the 2D tensor may be represented using a nested list. The nested list may comprise a series of sub-lists, each of which corresponds to a row of the tensor. Within each sub-list, the numerical values corresponding to the elements of the row may be listed in order. The row and column indices of each element may be determined by its position within the nested list. The 2D tensor may also be visualized as a matrix or grid, where each row and column corresponds to a particular dimension of the tensor. This visualization may make it easy to see the structure of the tensor and to perform operations such as matrix multiplication and transposition.

Prior to training, the matrix may be initiated randomly, such that each index value is generated randomly. During training, the index values are updated via reinforcement training to capture associations between different vehicle type ids and between sequentially linked (index specific) associations between the same. The post-trained index then is representative of associations between different vehicle type ids and/or between sequential associations between vehicle type ids. For example, if two vehicles frequently occur together in a specific sequence, the index values for those vehicles in the encoding matrix may be updated (by way of training a machine-learning model) to reflect this association. This may enable the encoding matrix to capture complex associations and relationships between different vehicle types that may not be immediately obvious.

After the training process, the encoding matrix can be used for various applications such as clustering, prediction, or recommendation. For example, the trained encoding matrix can be used to cluster vehicles based on their similarities, or to predict the likelihood of a user buying a certain vehicle based on previous user behaviors. It can also be used to recommend vehicles to users based on their preferences, prior user behaviors, or other data associated with the user.

Figure 7C:
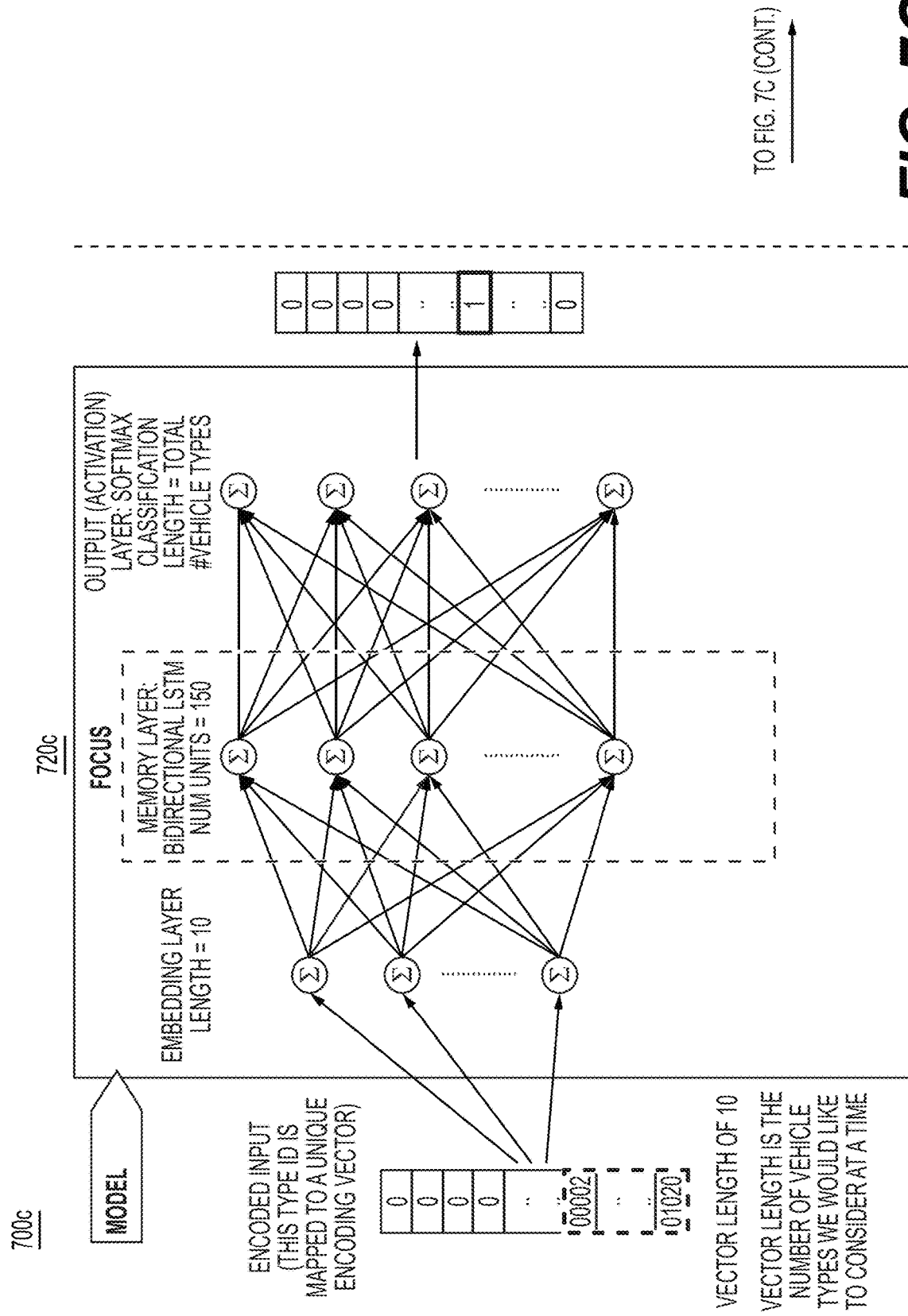
Figure 7C:
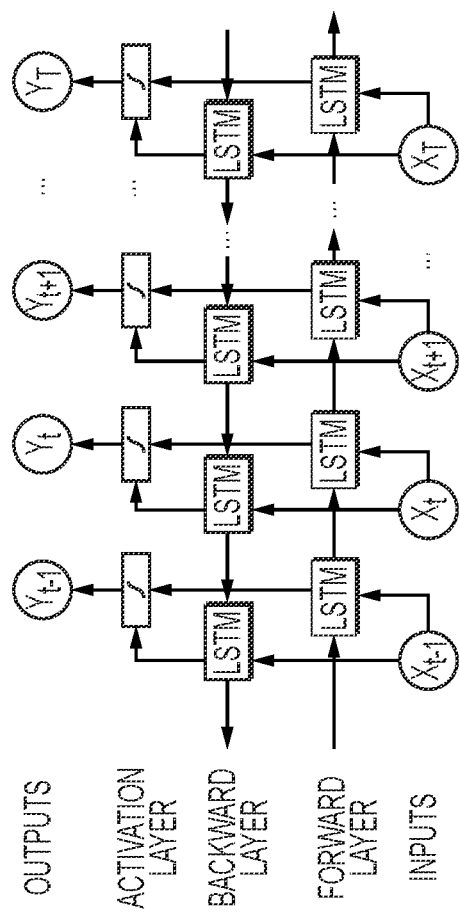
Figure 7D:
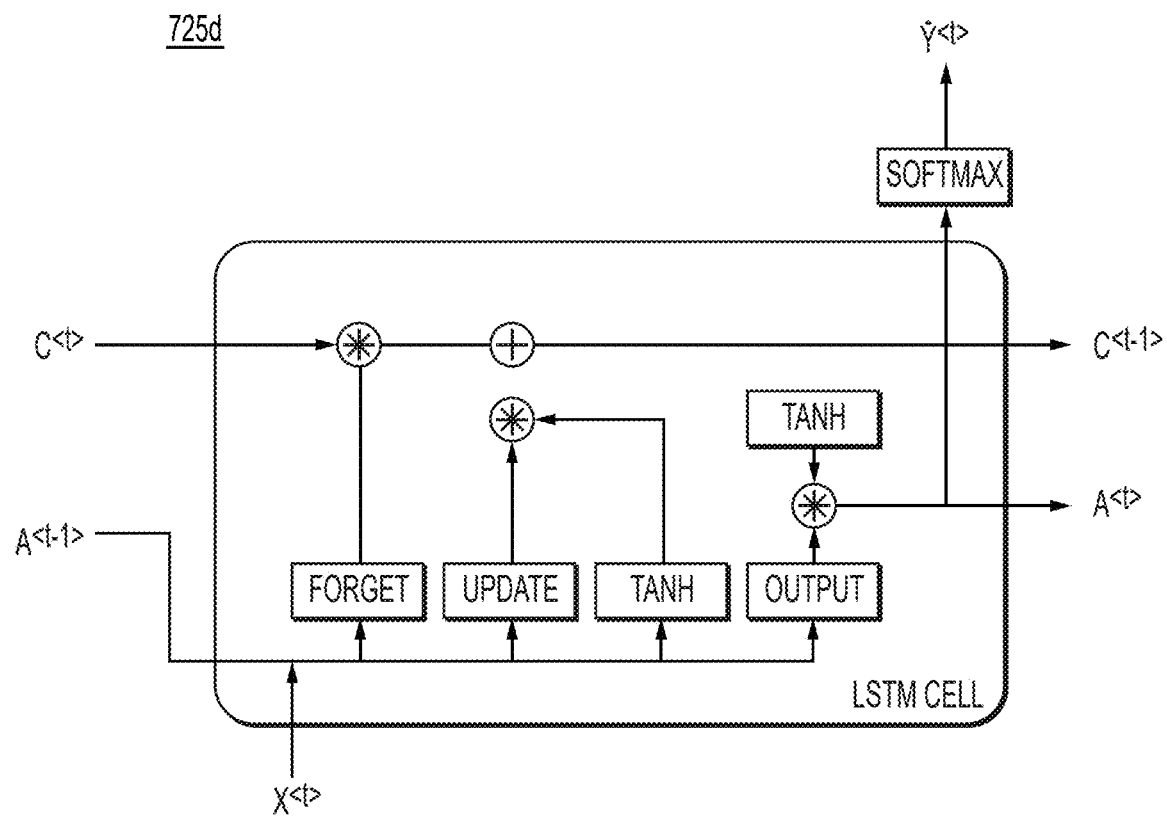

Referring to FIGS. 7C and 7D, the memory layer $720c$ may consist of nodes which receive one or more input form one or more node of the embedding layer. The memory layer may be a long-short-term-memory layer and/or unit. Long-Short-Term-Memory (LSTM) is a type of recurrent neural network (RNN) that is well-suited for processing sequences of data, such as time-series data or natural language text. LSTM is capable of retaining information over long periods of time, making it ideal for tasks that require long-term dependencies to be learned.

An LSTM block $725d$ consists of a number of memory cells, which are connected to each other through a set of gates. The gates control the flow of information into and out of the cells, and include a forget gate, an update (input) gate, and an output gate. The forget gate determines how much of the previous memory should be retained and how much should be forgotten, based on the current input and previous hidden state. The update (input) gate determines how much new information should be added to the memory cells, based on the current input and previous hidden state. The output gate determines how much information from the memory cells should be used to make a prediction, based on the current input and previous hidden state.

Importantly, the LSTM blocks may be in a bidirectional configuration, which may allow for information from a sequence to move both forwards and backwards, as desired. The LSTM may take a sequence as an input and similarly give a sequence of the same length as an output. For example, the LSTM may take a sequence of embeddings from the embedding layer and give an output to the activation layer of what the next vehicle in the sequence should be.

Figure 7E:
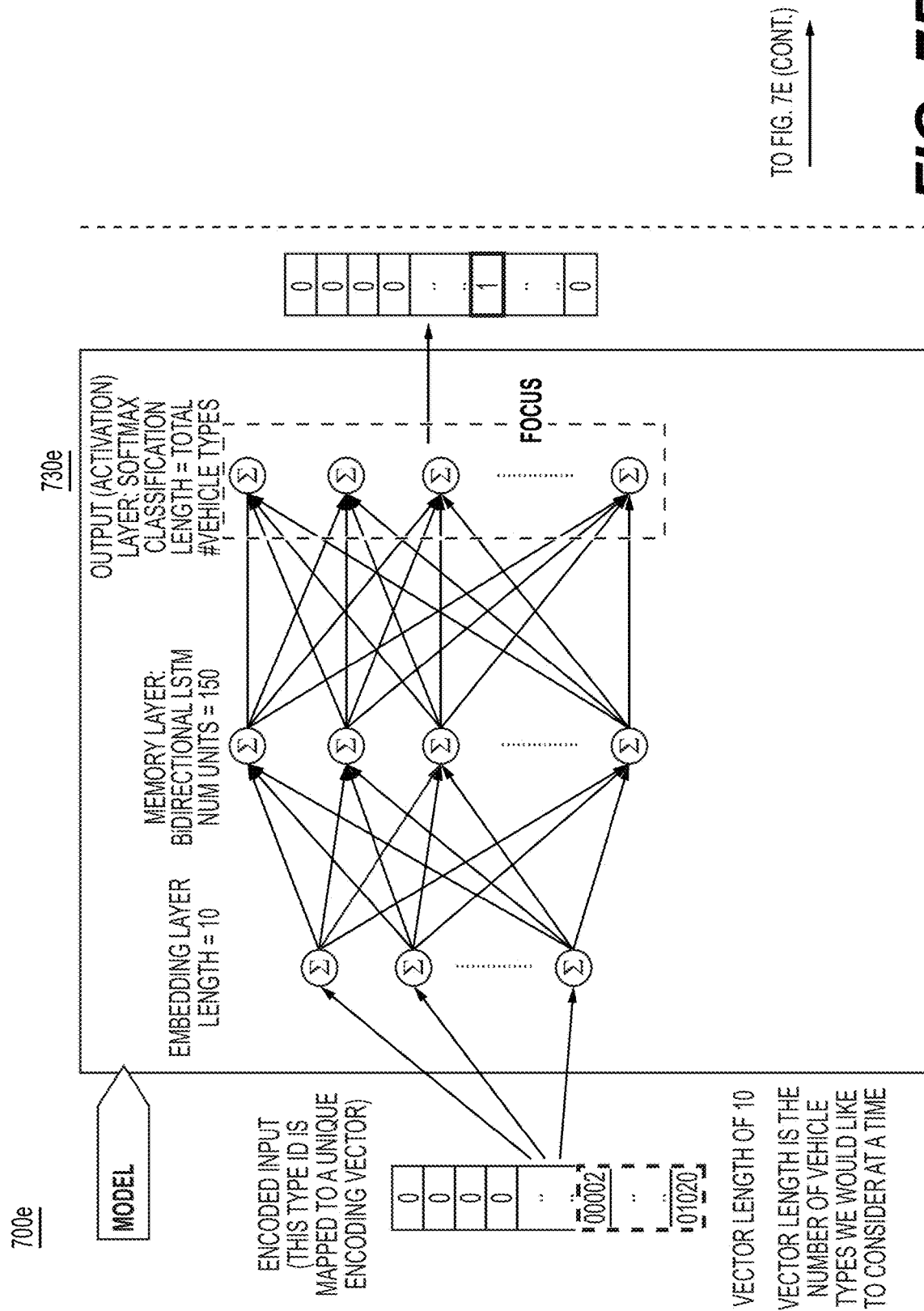
Figure 7E:
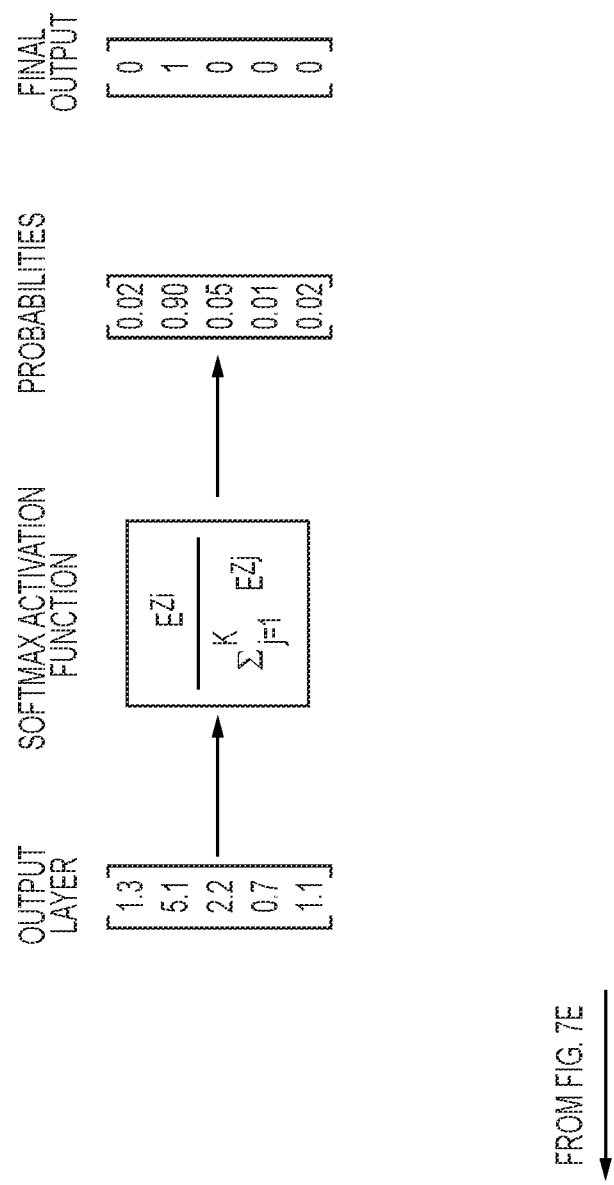

Referring to FIG. 7E, an output layer $730e$ is utilized to turn the neuron output into a prediction of the next user behavior given the input sequence. The layer may utilize one or more calculation, such as a SoftMax activation layer calculation, to calculate a pseudo probability, which calculates the ratio of expected vector of vehicle type to the sum of all the exponents of the various vectors of vehicle type. The final output may then be a vector with a single neuron/datum which is valued at 1 and where the rest are valued at zero. The single output of 1 is associated with the predicted next vehicle type.

Figure 7F:
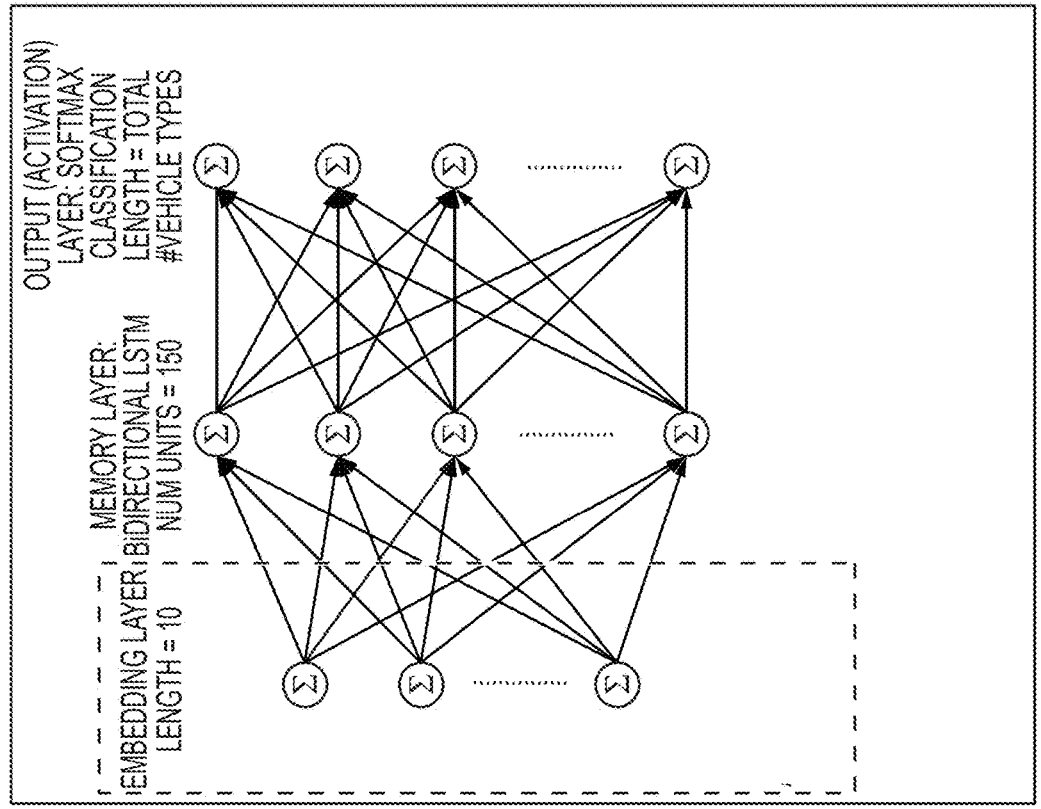
Figure 7F:

Referring to FIG. 7F, the model training utilizes gradient descent for back propagation which converts the randomized matrix $715f$ into a trained matrix $716f$, the trained matrix $716f$ then having values which may be representative of associations between different vehicle type ids and/or between sequential associations between vehicle type ids. These final vectors within the matrix may be utilized to determine vehicles types and/or categorization which are similar to one another. For example, when a customer interacts with multiple vehicles or engages in user behavior associated with multiple vehicles, an average of one or more vectors those vehicles and/or categories associated with those vehicles may be utilized to provide personalized recommendations and marketing.

Figure 8:
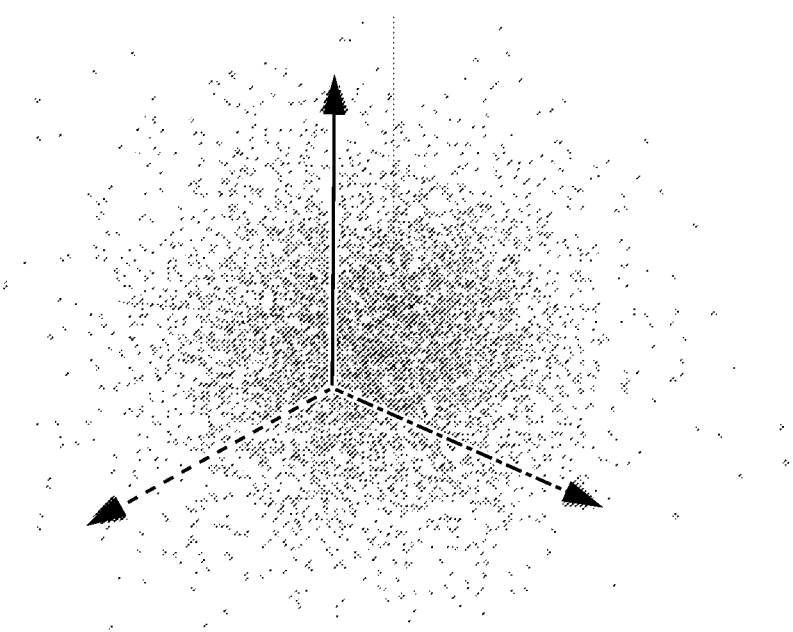
FIG. 8 depicts a machine-learning model, with a focus on an embedding layer.

FIG. 8 demonstrates a plot 800 showing a visualization of vehicle types/categories which may be found within an inventory. The plot is developed based at least in part from the trained matrix, and points which are closer to one another represent vehicle categories which are more similar to one another. The true distance between two points within the plot may be calculated utilizing Euclidean or Cosine distance. Thus, for a given vehicle type, it is possible for the system to calculate, and score, vehicle types which are similar to one or more vehicles of interest as indicated by the user. For example, given the theoretical average of the user's actual behaviors as they relate to vehicle searches, the system may utilize such calculations to lookup the closest vectors to the theoretical average, which enables the system to recommend vehicles with characteristics that are representative of vehicle types that are the most closely related to the theoretical average. In some embodiments, this may operate the same as the tensor categorical clustering and/or similarity assessments discussed herein, except the initial value for the determination of associated categories is an average of the index values for one or more categories associated with a user behavior.

Figure 9:
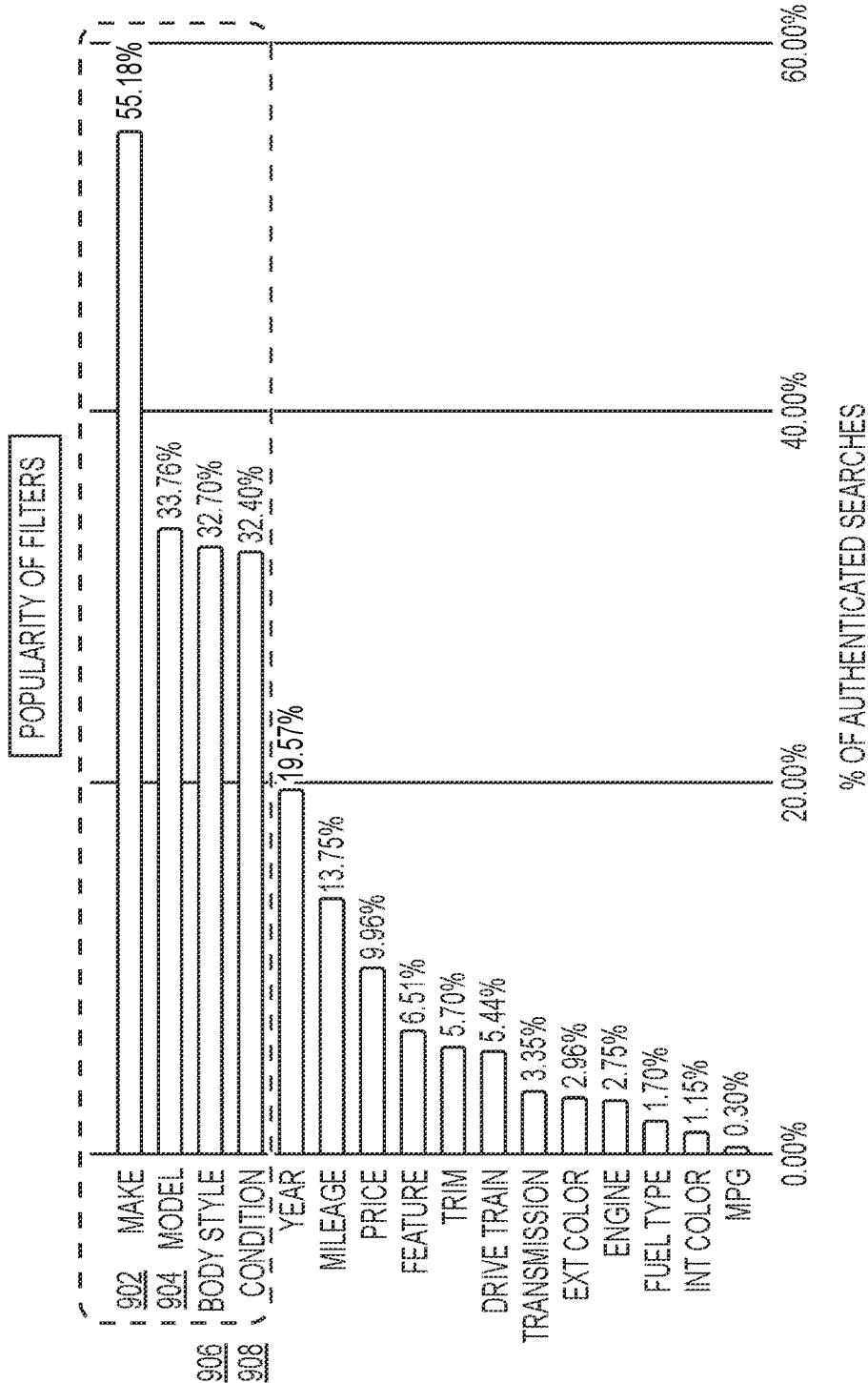
FIG. 9 depicts a machine-learning model, with a focus on a memory layer.
Figure 10:
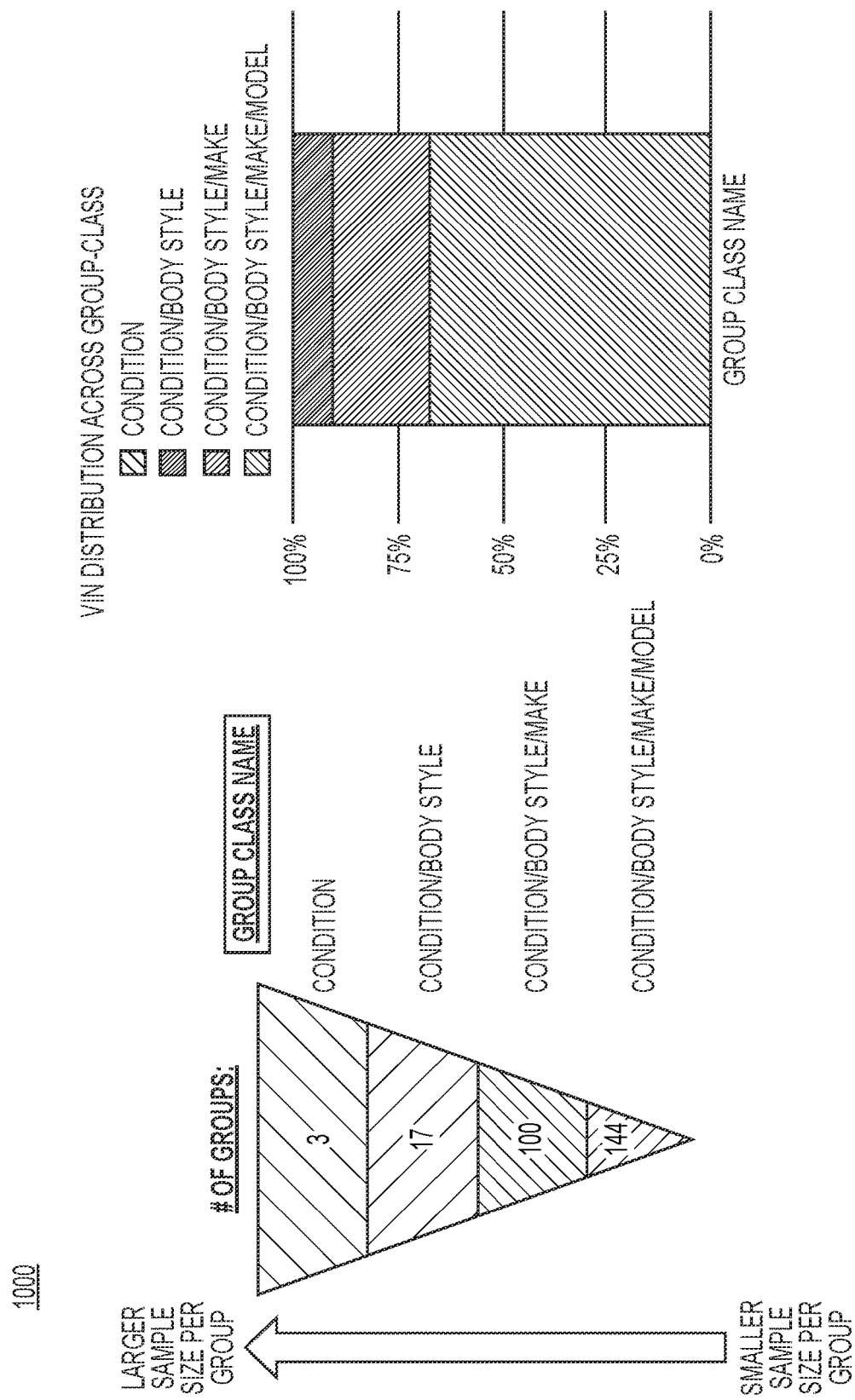
FIG. 10 depicts a long-short-term-memory block, according to some embodiments.

Referring to FIGS. 9 and 10, the concept of dynamic scaling is addressed. In FIG. 9, an assessment of user behavior 900 may be performed which indicates the popularity and/or usefulness of categorical filters as applied to an inventory of vehicles. A threshold number of filters, such as four filters as shown in the example in FIG. 9, may be selected as filters which are to be utilized to categorize every vehicle within an inventory. For example, the four filters in FIG. 9 are "Make" 902, "Model" 904, "Body Style" 906, and "Condition" 908, which when utilized in all ordered combination with all options produce 722 unique groupings of vehicles, wherein each vehicle within an inventory may be placed within any one of those groups. It will be appreciated that the example shown in FIG. 9 is non-limiting, and that other combinations of filter, other numbers of filters, and other total number of grouping are considered by the present disclosure. Moreover, as more user data is collected, the total filters utilized and/or the specific filters utilized may change based on user filter popularity and/or the present inventory available.

Referring to FIG. 10, a dynamic scaling 1000 concept is demonstrated. Following from the example in FIG. 9, a user behavior (such as viewing a vehicle) is categorized. When the user views a vehicle and/or an associated VIN, one or more characteristics associated with the vehicle are provided to the query system. The query system may then perform a dynamic scaling of which characteristics it will apply based on the current inventory and a pre-set threshold of vehicles that are desired to be considered within any given string or result. For example, the initial user behavior may result in a small number of groups when all filters (in this example, all four filters) are applied and the resulting total number of vehicles within the filtered groups may be low when compared to the total number of vehicles within the inventory. The system may compare the filtered number of vehicles against the total number of vehicle and determine that a pre-set threshold has not been met. For this example, the threshold of 30% of vehicles is utilized, but it will be appreciated that the threshold may be based on ratio, percentage, total number, or the like, and one of ordinary skill in the art would appreciate that the 30% utilized in this example is not limiting of the present disclosure.

If the system determines that the total number of vehicles within the filtered groups does not meet the threshold, the system may remove one of the classification filters, thereby increasing the total number of vehicles within the filtered groups. The system then once again checks to see if the total number of vehicles satisfies a threshold value. This iterative process repeats until either only a single categorical filter remains or until the system determines that the total number of vehicles within the filtered groups satisfies a threshold value. This dynamic classification may be applicable at any point in which the query system intakes serialized vehicle data, including: during the training stage when in taking sequential user behaviors; during application of user behaviors to the trained model, during the receipt of a model output and the generation of user recommendations of vehicles; and the like. The dynamic classification may enable the system to provide sufficient sample sizes to ensure reliability in training data, model outputs, and user recommendations.

Figure 11B:
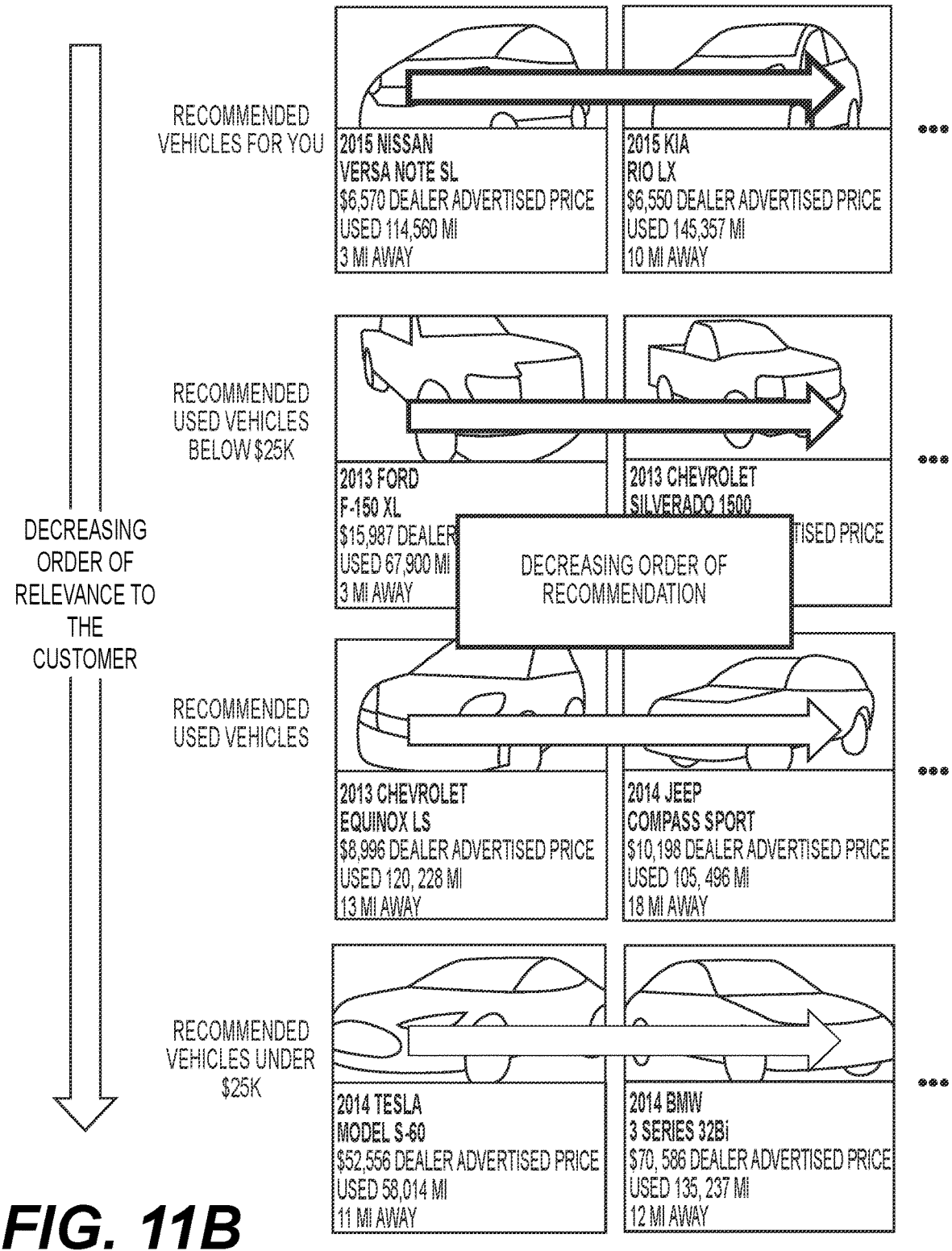

Referring to FIGS. 11A and 11B, the system may include a graphical user interface 1100 which displays one or more recommended vehicle to a user. The vehicle recommendations may be in the form of a single vehicle recommendation, but in some embodiments the vehicle recommendations are shown in a row-column grid arrangement. In some embodiments, the top row of the grid arrangement may include a category- and/or filter-agnostic recommendation of vehicles, which may be determined based on a vehicle recommendation score and/or vehicle recommendation category. Within the columns in the first row (and, in some embodiments, in subsequent rows), individual vehicles are displayed in descending recommended order, where the most highly recommended vehicle is placed on one side of the grid arrangement, the second highest recommended vehicle is placed in the next column, and so on. Once again, the recommendation of the vehicle may be determined by a vehicle recommendation score derived from the machine-learning model and/or associations between vehicles types that may be similar to the recommended vehicle type based on the output of the model.

Similarly, each descending row may be associated with one or more categorical filter and/or category associated with vehicle in the inventory. For example, the second row may be related to a category (dynamically adjusted or otherwise) which is similar to that output by the model, or in some embodiments it may be the category with the shortest distance based on the vector average and the plot demonstrating vehicle categorical associations and similarities. In some embodiments, the 2nd row will be representative of a vehicle category which is similar to one or more user interest and/or behavior, and each subsequent row will be representative of vehicle categories which have decreasing relevancy to the user. As discussed above, within each category, vehicles are displayed which match the categorical filters and displayed in descending order of relevance and/or recommendation to the user. In this manner, the system may flexibly display vehicles which are both relevant to the user (based on the categorical filters and/or dynamic categorization) and are recommended to the user within each row a relevancy. Advantageously, this is unique tailor to each user based on their prior search histories along with relevant vehicle inventories for the user, such an inventories which are within a particular geographic search range. In some embodiments, the data provided to the user within the grid may be considered a first dataset, and the first dataset may be generated at least in part off of the output of one or more machine-learning model.

It should be understood that embodiments in this disclosure are exemplary only, and that other embodiments may include various combinations of features from other embodiments, as well as additional or fewer features. For example, while some of the embodiments above pertain to user behaviors and vehicle searches, any suitable activity may be used. In an exemplary embodiment, instead of or in addition to vehicle searches, the system may be applicable to any product search, or searches unrelated to products, such as searches for other types of categorized and/or filtered data.

In general, any process or operation discussed in this disclosure that is understood to be computer-implementable, such as the processes illustrated in FIGS. 2-11B, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 12:
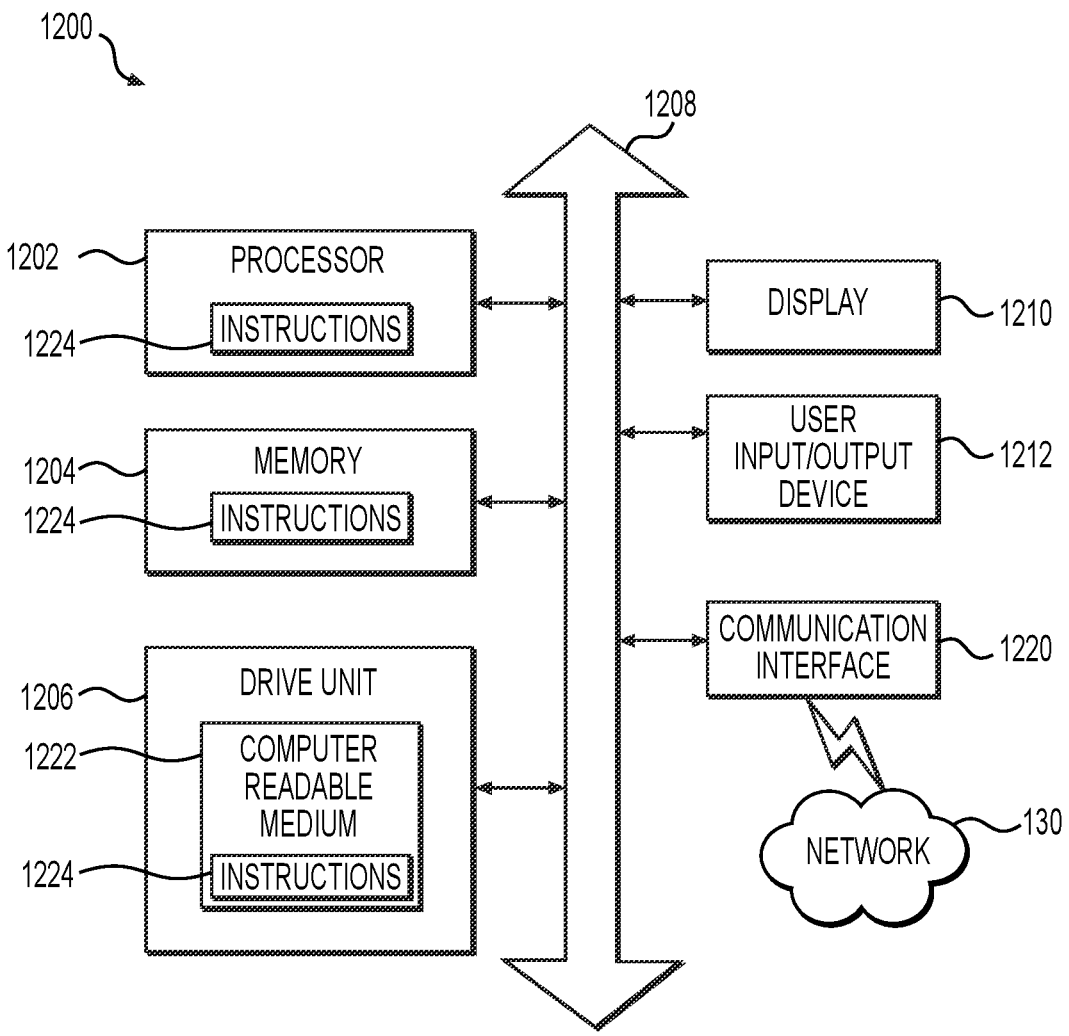
FIG. 12 depicts a training of a machine-learning model, according to some embodiments.

FIG. 12 is a simplified functional block diagram of a computer 1200 that may be configured as a device for executing the methods of FIGS. 2-11B, according to exemplary embodiments of the present disclosure. For example, the computer 1200 may be configured as the search system 110 and/or another system according to exemplary embodiments of this disclosure. In various embodiments, any of the systems herein may be a computer 1200 including, for example, a data communication interface 1220 for packet data communication. The computer 1200 also may include a central processing unit ("CPU") 1202, in the form of one or more processors, for executing program instructions. The computer 1200 may include an internal communication bus 1208, and a storage unit 1206 (such as ROM, HDD, SDD, etc.) that may store data on a computer readable medium 1222, although the computer 1200 may receive programming and data via network communications. The computer 1200 may also have a memory 1204 (such as RAM) storing instructions 1224 for executing techniques presented herein, although the instructions 1224 may be stored temporarily or permanently within other modules of computer 1200 (e.g., processor 1202 and/or computer readable medium 1222). The computer 1200 also may include input and output ports 1212 and/or a display 1210 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for personalized search results, comprising:
    receiving, by one or more processors, a first data object, the first data object including one or more sequentially ordered user inputs;
    receiving, by the one or more processors, a second data object, the second data object including data associated with a plurality of items;
    determining a plurality of filters based on the first data object,
        wherein each filter includes a priority indicator, and
        wherein each of the plurality of filters is based on at least part of the one or more user inputs;
    determining a resulting number of items in the second data object based on applying the plurality of filters;
    determining a pre-defined threshold has not been met by the resulting number of items;
    iteratively removing a filter having a lowest priority indicator of the plurality of filters until the resulting number of items satisfies the pre-defined threshold;

generating a token for each one or more user input, wherein classifications associated with one or more removed filters are excluded from the token;
inputting the one or more generated tokens in sequential combination to a machine-learning model;
generating a third data object based on an output of the machine-learning model; and
displaying the third data object to a user.

2. The method of claim 1, wherein the machine-learning model has been previously trained, said training including:
receiving a plurality of user inputs associated with a plurality of users, wherein each user is associated with at least two of said plurality of inputs;
tokenizing said plurality of inputs;
dynamically classifying the plurality of inputs and selecting one or more as training data and one or more as ground truth; and
reinforcing one or more associations between the training data and the ground truth.

3. The method of claim 2, wherein said plurality of user inputs includes a search string, said search string including a plurality of vehicle parameters.

4. The method of claim 2, wherein said plurality of user inputs includes a plurality of search strings, wherein the plurality of search strings are in a sequential order, and wherein the tokenizing includes identifying one of the plurality of search strings as a target search string.

5. The method of claim 4, the method further including identifying one or more search string which appears before the target search string.

6. The method of claim 2, wherein the machine-learning model is further trained on input data associated with one or more parameter or preference of a user account associated with each of said one or more user input.

7. The method of claim 1, wherein the one or more user inputs includes at least a first search sequence, the first search sequence including at least a first search string.

8. The method of claim 1, wherein said iteratively removing the filter having the lowest priority indicator includes:
identifying the filter of the plurality of filters with the lowest priority indicator;
removing the identified filter with the lowest priority indicator from the plurality of filters;
re-applying the plurality of filters to the second data object;
determining an updated resulting number of items;
comparing the resulting updated number of items against the pre-defined threshold; and
determining whether a number of items exceeds the pre-defined threshold.

9. The method of claim 1, wherein displaying the third data object to the user includes arranging information in the third data object into a ranking grid, wherein the ranking grid includes a plurality of rows and a plurality of columns, wherein a top row is associated with an overall ranking of the third data object, and wherein each row below the top row is associated with a subset of the third data object, shown in decreasing relevancy as the rows descend.

10. The method of claim 9, wherein the columns in each row display a plurality of vehicles within the third data object, ranked by relevancy.

11. A system, the system comprising:
at least one memory storing instructions; and
at least one processor operatively connected to the at least one memory, and configured to execute the instructions to perform operations for personalized search results, the operations including:
receiving, by one or more processors, a first data object, the first data object including one or more sequentially ordered user inputs;
receiving, by the one or more processors, a second data object, the second data object including data associated with a plurality of items;
determining a plurality of filters based on the first data object,
wherein each filter includes a priority indicator, and
wherein each of the plurality of filters is based on at least part of the one or more user inputs;
determining a resulting number of items in the second data object based on applying the plurality of filters;
determining a pre-defined threshold has not been met by the resulting number of items;
iteratively removing a filter having a lowest priority indicator of the plurality of filters until the resulting number of items satisfies the pre-defined threshold;
generating a token for each one or more user input, wherein classifications associated with one or more removed filters are excluded from the token;
inputting the one or more generated tokens in sequential combination to a machine-learning model;
generating a third data object based on an output of the machine-learning model; and
displaying the third data object to a user.

12. The system of claim 11, wherein the machine-learning model has been previously trained, said training including:
receiving a plurality of user inputs associated with a plurality of users, wherein each user is associated with at least two of said plurality of inputs;
tokenizing said plurality of inputs;
dynamically classifying the plurality of inputs and selecting one or more as training data and one or more as ground truth; and
reinforcing one or more associations between the training data and the ground truth.

13. The system of claim 12, wherein said plurality of user inputs includes a search string, said search string including a plurality of vehicle parameters.

14. The system of claim 12, wherein said plurality of user inputs includes a plurality of search strings, wherein the plurality of search strings are in a sequential order, and wherein the tokenizing includes identifying one of the plurality of search strings as a target search string.

15. The system of claim 14, the operations further including identifying one or more search string which appears before the target search string.

16. The system of claim 12, wherein the machine-learning model is further trained on input data associated with one or more parameter or preference of a user account associated with each of said one or more user input.

17. The system of claim 11, wherein the one or more user inputs includes at least a first search sequence, the first search sequence including at least a first search string.

18. The system of claim 11, wherein said iteratively removing the filter with having the lowest priority indicator includes:
identifying the filter of the plurality of filters with the lowest priority indicator;
removing the identified filter with the lowest priority indicator from the plurality of filters;
re-applying the plurality of filters to the second data object;
determining an updated resulting number of items;
comparing the resulting updated number of items against the pre-defined threshold; and determining whether a number of items exceeds the pre-defined threshold.

19. The system of claim 11, wherein displaying the third data object to the user includes arranging information in the third data object into a ranking grid, wherein the ranking grid includes a plurality of rows and a plurality of columns, wherein a top row is associated with an overall ranking of the third data object, and wherein each row below the top row is associated with a subset of the third data object, shown in decreasing relevancy as the rows descend.

20. A method for personalized search results, comprising:
receiving, by one or more processors, a first data object, the first data object including one or more sequentially ordered user inputs;
receiving, by the one or more processors, a second data object, the second data object including data associated with a plurality of items;
determining a plurality of filters based on the first data object,
wherein each filter includes a priority indicator, and
wherein each of the plurality of filters is based on at least part of the one or more user inputs;
determining a resulting number of items in the second data object based on applying the plurality of filters;
determining a pre-defined threshold has not been met by the resulting number of items;
iteratively removing a filter having a lowest priority indicator of the plurality of filters until the resulting number of items satisfies the pre-defined threshold by:
identifying the filter of the plurality of filters with the lowest priority indicator,
removing the identified filter with the lowest priority indicator from the plurality of filters,
re-applying the plurality of filters to the second data object,
determining an updated resulting number of items,
comparing the resulting updated number of items against the pre-defined threshold, and
determining whether a number of items exceeds the pre-defined threshold;
generating a token for each one or more user input, wherein classifications associated with one or more removed filters are excluded from the token;
inputting the one or more generated tokens in sequential combination to a machine-learning model, the machine-learning model having been trained by:
receiving a plurality of inputs associated with a plurality of users, wherein each user is associated with at least two of said plurality of inputs,
tokenizing said plurality of inputs,
dynamically classifying the plurality of inputs and selecting one or more as training data and one or more as ground truth, and
reinforcing one or more associations between the training data and the ground truth;
generating a third data object based on an output of the machine-learning model; and
displaying the third data object to a user.

* * * * *